US011641794B2

(12) United States Patent
Fan et al.

(10) Patent No.: US 11,641,794 B2
(45) Date of Patent: May 9, 2023

(54) TRANSMISSION DISCONNECTION BY WHEEL ROTATION FOR WALK-BEHIND MACHINE

(71) Applicant: Nanjing Chervon Industry Co., Ltd., Nanjing (CN)

(72) Inventors: Gongyuan Fan, Nanjing (CN); Zhen Wang, Nanjing (CN)

(73) Assignee: Nanjing Chervon Industry Co., Ltd., Nanjing (CN)

(*) Notice: Subject to any disclaimer, the term of this patent is extended or adjusted under 35 U.S.C. 154(b) by 302 days.

(21) Appl. No.: 16/662,317

(22) Filed: Oct. 24, 2019

(65) Prior Publication Data

US 2020/0053960 A1 Feb. 20, 2020

Related U.S. Application Data

(63) Continuation of application No. 16/371,267, filed on Apr. 1, 2019, now Pat. No. 10,524,417, which is a (Continued)

(30) Foreign Application Priority Data

Dec. 23, 2016 (CN) .......................... 201611205394.X
Nov. 8, 2017 (CN) ........................... 201711093658.1

(51) Int. Cl.
*A01D 34/69* (2006.01)
*A01D 34/68* (2006.01)
(Continued)

(52) U.S. Cl.
CPC .......... *A01D 34/69* (2013.01); *A01D 34/6812* (2013.01); *A01D 34/6818* (2013.01); (Continued)

(58) Field of Classification Search
CPC .... A01D 34/69; A01D 34/6812; A01D 69/08; A01D 69/06; F16D 41/066; F16D 41/067; F16D 41/088; B62D 51/04
See application file for complete search history.

(56) References Cited

U.S. PATENT DOCUMENTS 4,689,939 A 9/1987 Seyerie
5,303,534 A * 4/1994 Gray ....................... B60L 15/20
56/17.5
(Continued)

FOREIGN PATENT DOCUMENTS

CN 201190743 Y 2/2009
CN 201360427 Y 12/2009
(Continued)

OTHER PUBLICATIONS

ISA/CN, International Search Report issued on PCT application No. CN2017/117722, 3 pages, dated Mar. 13, 2018.
(Continued)

*Primary Examiner* — Adam J Behrens
*Assistant Examiner* — Madeline I Runco
(74) *Attorney, Agent, or Firm* — Greenberg Traurig, LLP

(57) ABSTRACT

A walk-behind machine includes a clutch having a driving state where a motor drives wheels to rotate and an unlocked state where the wheels freely rotate relative to the motor. The clutch includes a movable member and a driving member. The movable member is capable of moving between a locked position where the clutch is in the driving state and an unlocked position where the clutch is in the unlocked state. The driving member transfers power to the wheels by means of friction. When the clutch is in the driving state, the motor drives the wheels to rotate in a first direction, when the motor stops rotating, the wheels rotate in a second direction opposite to the first direction and can drive the driving member to move by frictional force so that the
(Continued)

driving member pushes the movable member to move from the locked position to the unlocked position.

20 Claims, 19 Drawing Sheets

Related U.S. Application Data continuation of application No. PCT/CN2017/117722, filed on Dec. 21, 2017.

(51) Int. Cl.
    *A01D 69/08*     (2006.01)
    *F16H 3/10*     (2006.01)
    *A01D 69/06*     (2006.01)
    *A01D 101/00*     (2006.01)

(52) U.S. Cl.
    CPC ............. *A01D 69/06* (2013.01); *A01D 69/08* (2013.01); *F16H 3/10* (2013.01); *A01D 2101/00* (2013.01)

(56) References Cited

U.S. PATENT DOCUMENTS

| | | | |
|---|---|---|---|
| 6,354,414 B1 | 3/2002 | Sueshige et al. | |
| 6,575,280 B2* | 6/2003 | Ballew | F16D 41/12 192/46 |
| 6,655,515 B2* | 12/2003 | Cox | F16D 41/088 192/38 |
| 6,681,909 B2* | 1/2004 | Cox | F16D 41/20 180/6.2 |
| 6,722,484 B2* | 4/2004 | Ochab | F16D 21/08 192/48.92 |
| 7,967,121 B2* | 6/2011 | Cali | F16D 41/12 192/42 |
| 9,456,546 B2* | 10/2016 | Blanchard | F16D 43/2024 |
| 9,759,300 B2* | 9/2017 | Barendrecht | A01D 34/6806 |
| 9,856,930 B2* | 1/2018 | Heath | F16D 41/105 |
| 10,039,229 B2* | 8/2018 | Wadzinski | A01D 34/824 |
| 10,306,831 B2* | 6/2019 | Porter | A01D 34/005 |
| 10,605,314 B2* | 3/2020 | Vaughn | F16H 1/06 |
| 10,690,230 B2* | 6/2020 | Teillet | F16H 57/029 |
| 11,125,313 B2* | 9/2021 | Teillet | F16H 57/029 |
| 2002/0178708 A1* | 12/2002 | Williams | A01D 34/69 56/10.8 |
| 2006/0042213 A1 | 3/2006 | Plouraboue et al. | |
| 2007/0130899 A1 | 6/2007 | Osborne | |
| 2009/0199678 A1 | 8/2009 | Irikura et al. | |
| 2015/0245559 A1* | 9/2015 | Yang | A01D 34/64 56/17.5 |
| 2015/0252899 A1 | 9/2015 | Blanchard | |
| 2019/0301544 A1* | 10/2019 | Vaughn | F16D 11/14 |
| 2020/0340539 A1* | 10/2020 | Matsumoto | A01D 69/08 |

FOREIGN PATENT DOCUMENTS

| | | | |
|---|---|---|---|
| CN | 102232331 A | 11/2011 | |
| CN | 202251540 U | 5/2012 | |
| CN | 103202136 A | 7/2013 | |
| CN | 105830645 A | 8/2016 | |
| CN | 205510937 U | 8/2016 | |
| CN | 105960950 A | 9/2016 | |
| DE | 202010005099 U1 * | 7/2010 | ............. A01D 34/57 |
| KR | 101675383 B1 | 11/2016 | |
| WO | 2011056184 A2 | 5/2011 | |
| WO | WO-2018040054 A1 * | 3/2018 | ......... A01D 34/6812 |

OTHER PUBLICATIONS

Canadian Patent Office, Office Action issued on Canadian patent application 3,043,387, dated Aug. 18, 2020, 5 pages.

* cited by examiner

A-A

B-B

TRANSMISSION DISCONNECTION BY WHEEL ROTATION FOR WALK-BEHIND MACHINE

RELATED APPLICATION INFORMATION

This application is a continuation of U.S. patent application Ser. No. 16/371,267 filed Apr. 1, 2019, which claims the benefit of Chinese Patent Application No. 201611205394.X, filed on Dec. 23, 2016, and Chinese Patent Application No. 201711093658.1, filed on Nov. 8, 2017, each of which is incorporated herein by reference in its entirety.

FIELD OF DISCLOSURE

The present disclosure relates to a walk-behind machine.

BACKGROUND

Lawn mowers, snow throwers, etc. are typical walk-behind machines. A walk-behind machine includes a motor, a plurality of wheels, and a transmission mechanism. The motor drives the wheels to rotate through the transmission mechanism so that the walk-behind machine moves relative to the ground.

The walk-behind machine requires the right wheel and the left wheel to rotate at different speeds during steering. The walk-behind machine is provided with a clutch to enable the right wheel and the left wheel to rotate asynchronously. Generally, the rotation speed of a wheel is greater than the other wheel's. The clutch is also called a differential device. For the typical walk-behind machine with that clutch, when the motor shaft stops rotating, the machine can be pushed forward to make the wheels continue to rotate forward, and the clutch can cut off the transmission between the wheels and the motor shaft. When the motor stops rotating and the machine is pulled backward to rotate the wheel backward, the clutch cannot disconnect the transmission between the wheels and the motor shaft, and the wheels will drive the motor shaft to rotate. At this point where the differential device is in a driving state, a large force is required to pull the walk-behind machine to move backward, which is known as the "lock-up" phenomenon. After the motor stops rotating, in order to disconnect the transmission between the wheels and the motor shaft and in order to make the differential device enter into an unlocked state, the machine needs to be pushed forward to unlock the differential device, then the wheels can rotate freely relative to the motor shaft. Pulling the walk-behind machine backward cannot make the machine "unlocked," which brings great inconvenience to users.

After the motor stops and when the machine is pushed or is pulled, the wheels will rotate and drive the motor shaft to rotate through the transmission mechanism. In that condition, a great force is required to push or pull the machine to move.

SUMMARY

In one aspect of the disclosure, a walk-behind machine, includes a chassis, a handle, wheels, a first motor, a working element, a second motor, and a transmission mechanism. The handle is connected to the chassis. The wheels are for supporting the chassis and can rotate relative to the chassis. The first motor is mounted to the chassis, for providing a driving force to rotate the wheels. The working element moves relative to the chassis to implement the machine's function. The second motor is for driving the working element to move. The transmission mechanism connects the first motor with the wheels and includes a clutch for realizing one-way transmission between the first motor and the wheels, wherein the clutch has a driving state where the first motor drives the wheels to rotate and an unlocked state where the wheels freely rotate relative to the first motor. The clutch includes a movable member and a driving member. The movable member is capable of moving between a locked position and an unlocked position. The driving member transfers power with the wheels by means of friction. When the movable member is in the locked position, the clutch is in the driving state where the first motor is capable of driving the wheels to rotate in a first direction. When the movable member is in the unlocked position the clutch is in the unlocked state. When the first motor stops rotating, the wheels rotate in a second direction opposite to the first direction, and can drive the driving member to move so that the driving member pushes the movable member to move from the locked position to the unlocked position.

In one or more examples, the first motor includes a motor shaft for outputting a driving force. The clutch includes a transmission shaft, a fixing member and an outer ring member. The transmission shaft is connected to the motor shaft and is driven by the motor shaft to rotate. The fixing member is coupled to the transmission shaft or is a part of the transmission shaft and forms a driving surface capable of driving the movable member. The outer ring member is sleeved on the transmission shaft, is connected to the wheels to drive the wheels to rotate and forms a mounting groove. The movable member is located between the wall of the mounting groove and the driving surface.

In one or more examples, the wall of the mounting groove is an annular surface, and the movable member is a pin.

In one or more examples, the driving member includes a plurality of driving portions, and the driving portions get into the mounting groove and are capable of contacting the movable member to push the movable member to move.

In one or more examples, the clutch includes a plurality of movable members and the number of the movable members is the same as the number of driving portions. The driving portions and the movable members are alternatively arranged.

In one or more examples, the fixing member forms a plurality of driving surfaces and the number of the driving surfaces is the same as the number of movable members, the driving surfaces are in one-to-one correspondence with the movable members.

In one or more examples, the frictional force between the wheels and the driving member is greater than the frictional force between the fixing member and the movable member when the movable member is in the locked position.

In one or more examples, the wheels form a first wheel gear or a first wheel gear is mounted on the wheels. The walk-behind machine further includes a first transmission gear meshing with the first wheel gear and driven by the transmission shaft to drive the wheel to rotate. When the motor shaft actively rotates, the transmission shaft drives the first transmission gear to rotate so as to rotate the wheels and the wheels exert a force, whose direction is opposite to the rotation direction of the first transmission gear, to the driving member.

In one or more examples, the wheels form a second wheel gear or a second wheel gear is mounted on the wheels. The walk-behind machine further includes a second transmission gear meshing with the second wheel gear. When the wheels rotate, the first transmission gear and the second transmission gear rotate in opposite directions and the second transmission gear exerts a force, whose direction is opposite to the rotation direction of the first transmission gear, to the driving member.

In one or more examples, the walk-behind machine further includes a friction plate disposed between the second transmission gear and the driving member and realizing the friction transmission between the second transmission gear and the driving member.

In one or more examples, the clutch includes a magnet exerting a magnetic attractive force to the movable member.

In one or more examples, the clutch includes a plurality of the movable members and the magnets, whose number is equivalent to the number of the movable members. The transmission shaft rotates about a central axis, in the direction of which magnets exert a magnetic attractive force to the movable members of the central axis.

In one or more examples, the magnets are fixed to the outer ring member and are evenly distributed in the circumferential direction of the central axis.

In one or more examples, the magnet is annular and surrounds the transmission shaft.

A walk-behind machine, includes a chassis, a working element, a handle, wheels, a motor and a clutch. The working element moves relative to the chassis to implement the machine's function. The handle is connected to the chassis. The wheels are for supporting the chassis and can rotate relative to the chassis. The motor is capable of providing a driving force for rotating the wheels and includes a motor shaft for outputting the driving force. The clutch is capable of one-way transmitting between the motor shaft and the wheels. The clutch has a driving state where the motor shaft drives the wheels to rotate and an unlocked state where the wheels freely rotate relative to the motor shaft. The clutch includes a movable member and a driving member. The movable member is capable of moving between a locked position and an unlocked position. The driving member could be driven by the wheels. When the movable member is in the locked position the clutch is in the driving state where the motor shaft drives the wheels to rotate in a first direction. When the movable member is in the unlocked position the clutch is in the unlocked state. When the motor shaft stops rotating, the wheels rotate in a second direction opposite to the first direction and can drive the driving member to move so that the driving member pushes the movable member to move from the locked position to the unlocked position.

In one or more examples, the wheels drive the driving member by friction.

In one or more examples, the clutch includes a transmission shaft, a fixing member and an outer ring member. The transmission shaft is coupled to the motor shaft and is driven to rotate by the motor shaft. The fixing member is coupled to the transmission shaft or is a part of the transmission shaft and forms a driving surface capable of driving the movable member. The outer ring member is sleeved on the transmission shaft and is connected to the wheels to drive the wheels to rotate. The outer ring member forms a mounting groove between the wall of which and the driving surface the movable member is located.

In one or more examples, the wall of the mounting groove is an annular surface, and the movable member is a pin.

In one or more examples, the driving member includes a plurality of driving portions, and the driving portions get into the mounting groove and are capable of contacting the movable member to push the movable member to move.

In one or more examples, the clutch includes a plurality of movable members and the number of the movable members is equivalent to the number of driving portions. The driving portions and the movable members are alternatively arranged.

In one or more examples, the fixing member forms a plurality of driving surfaces and the number of the driving surfaces is the same as the number of movable members, the driving surfaces are in one-to-one correspondence with the movable members.

In one or more examples, the wheels form a first wheel gear or a first wheel gear is mounted on the wheels, and the walk-behind machine further includes a first transmission gear meshing with the first wheel gear and driven by the transmission shaft to drive the wheel to rotate. When the motor shaft actively rotates, the transmission shaft drives the first transmission gear to rotate, thereby driving the wheels to rotate and the wheels exert a force, whose direction is opposite to the rotation direction of the first transmission gear, to the driving member.

In one or more examples, the wheels form a second wheel gear or a second wheel gear is mounted on the wheels, and the walk-behind machine further includes a second transmission gear meshing with the second wheel gear. When the wheels rotate, the first transmission gear and the second transmission gear rotate in opposite directions and the second transmission gear exerts a force whose direction is opposite to the rotation direction of the first transmission gear to the driving member.

In one or more examples, the walk-behind machine further includes a friction plate disposed between the second transmission gear and the driving member and realizing the friction transmission between the second transmission gear and the driving member.

In one or more examples, the walk-behind machine has a self-propelled forward-moving mode in which the motor drives the wheels to rotate in the first direction and a self-propelled backward-moving mode. When the motor is turned off, the walk-behind machine is out of the self-propelled forward-moving mode and the walk-behind machine is pushed forward to make the wheels rotate in the first direction, the wheels drive the movable member to move from the locked position to the unlocked position and the clutch turns into the unlocked state. When the walk-behind machine is in the self-propelled backward-moving mode, the motor drives the wheels to rotate in the second direction opposite to the first direction. When the motor is turned off, the walk-behind machine is out of the self-propelled backward-moving mode and the walk-behind machine is pushed to make the wheels rotate in the second direction, the wheels drive the movable member to move from the locked position to the unlocked position and the clutch into the unlocked state.

In one or more examples, when the motor is turned off, the walk-behind machine is out of the self-propelled forward-moving mode and the walk-behind machine is pushed backward to make the wheels rotate in the second direction, the wheels drive the movable member to move from the locked position to the unlocked position and the clutch turns into the unlocked state. When the motor is turned off, the walk-behind machine is out of the self-propelled backward-moving mode and the walk-behind machine is pushed forward to make the wheels rotate in the first direction, the wheels drive the movable member to move from the locked position to the unlocked position and the clutch turns into the unlocked state.

In one or more examples, the walk-behind machine has a self-propelled forward-moving mode in which the motor drives the wheels to rotate in the first direction and a self-propelled backward-moving mode in which the motor drives the wheels to rotate in the second direction opposite to the first direction. When the motor is turned off and the walk-behind machine is pushed to drive the wheels to turn at an angle in any direction, the wheels drive the movable member to move from the locked position to the unlocked position and the clutch turns into the unlocked state.

In one or more examples, the walk-behind machine further includes a transmission mechanism connecting the motor shaft and the wheels, wherein the transmission mechanism includes the clutch and a gearbox connecting the motor shaft and the clutch.

In one or more examples, the clutch includes a magnet exerting a magnetic attractive force to the movable member.

In one or more examples, the clutch includes a plurality of the movable members and the magnets, whose number is the same as the number of magnets and the transmission shaft rotates about a central axis, in the direction of which magnets exert a magnetic attractive force to the movable members of the central axis.

In one or more examples, the magnets are fixed to the outer ring member and are evenly distributed in the circumferential direction of the central axis.

In one or more examples, the magnet is annular and surrounds the transmission shaft.

In one or more examples, the working element is driven to move by the motor.

In one or more examples, the walk-behind machine further includes a second motor for driving the working element to move.

A walk-behind machine, including a chassis, a handle, wheels, a motor, and a transmission mechanism. The handle is connected to the chassis. The wheels are for supporting the chassis and capable of rotating relative to the chassis. The motor is capable of providing a driving force for rotating the wheels. The transmission mechanism connects the motor with the wheels and includes a clutch for realizing one-way transmission between the motor and the wheels. The clutch has a driving state where the motor drives the wheels to rotate and an unlocked state where the wheels freely rotate relative to the motor. The clutch includes a movable member capable of moving between a locked position and an unlocked position. When the movable member is in the locked position the clutch is in the driving state where the motor actively rotates to drive the wheels to rotate. When the movable member is in the unlocked position the clutch is in the unlocked state. When the motor stops rotating, the wheels rotate at an angle in any direction and drive the movable member to move from the locked position to the unlocked position.

In one or more examples, the clutch further includes a driving member. When the clutch is in the driving state, the motor can drive the wheels to rotate in a first direction. When the motor stops rotating, the wheels rotate in a second direction opposite to the first direction, and can drive the driving member to move so that the driving member pushes the movable member to move from the locked position to the unlocked position.

In one or more examples, the wheels can drive the driving member to move by friction force.

In one or more examples, the motor includes a motor shaft for outputting a driving force. The clutch includes a transmission shaft, a fixing member and an outer ring member. The transmission shaft is connected to the motor shaft and is driven by the motor shaft to rotate. The fixing member is coupled to the transmission shaft or is a part of the transmission shaft and forms a driving surface capable of driving the movable member. The outer ring member is sleeved on the transmission shaft, is connected to the wheels to drive the wheel to rotate and forms a mounting groove. The movable member is located between the wall of the mounting groove and the driving surface.

In one or more examples, the wall of the mounting groove is an annular surface, and the movable member is a pin.

In one or more examples, the wheels form a first wheel gear or a first wheel gear is mounted on the wheels. The walk-behind machine further includes a first transmission gear meshing with the first wheel gear and driven by the transmission shaft to drive the wheels to rotate. When the motor shaft actively rotates, the transmission shaft drives the first transmission gear to rotate so as to rotate the wheels and the wheels exert a force, whose direction is opposite to the rotation direction of the first transmission gear, to the driving member.

In one or more examples, the wheels form a second wheel gear or a second wheel gear is mounted on the wheels. The walk-behind machine further includes a second transmission gear meshing with the second wheel gear. When the wheels rotate, the first transmission gear and the second transmission gear rotate in opposite directions and the second transmission gear exerts a force, whose direction is opposite to the rotation direction of the first transmission gear, to the driving member.

In one or more examples, the walk-behind machine further includes a friction plate disposed between the second transmission gear and the driving member to realize the friction transmission between the second transmission gear and the driving member.

In one or more examples, the walk-behind machine has a self-propelled forward mode and a self-propelled backward mode. When the walk-behind machine is in the self-propelled forward mode, the motor drives the wheels to rotate in the first direction. When the motor is turned off, the walk-behind machine is out of the self-propelled forward mode and the walk-behind machine is pushed forward to make the wheels rotate in the first direction, the wheels drive the movable member to move from the locked position to the unlocked position and the clutch gets into the unlocked state. When the walk-behind machine is in the self-propelled backward mode, the motor drives the wheels to rotate in the second direction opposite to the first direction. When the motor is turned off, the walk-behind machine is out of the self-propelled backward mode and the walk-behind machine is pushed backward to make the wheels rotate in the second direction, the wheels drive the movable member to move from the locked position to the unlocked position and the clutch gets into the unlocked state.

In one or more examples, when the motor is turned off, the walk-behind machine is out of the self-propelled forward-moving mode and the walk-behind machine is pushed backward to make the wheels rotate in the second direction, the wheels drive the movable member to move from the locked position to the unlocked position and the clutch turns into the unlocked state. When the motor is turned off, the walk-behind machine is out of the self-propelled backward-moving mode and the walk-behind machine is pushed forward to make the wheels rotate in the first direction, the wheels drive the movable member to move from the locked position to the unlocked position and the clutch turns into the unlocked state.

In one or more examples, the walk-behind machine has a self-propelled forward-moving mode in which the motor drives the wheels to rotate in the first direction and a self-propelled backward-moving mode in which the motor drives the wheels to rotate in the second direction opposite to the first direction. When the motor is turned off, the walk-behind machine could be pushed to drive the wheels to turn at an angle in any direction and the wheels drive the movable member to move from the locked position to the unlocked position, the clutch turning into the unlocked state.

DETAILED DESCRIPTION

Figure 1:
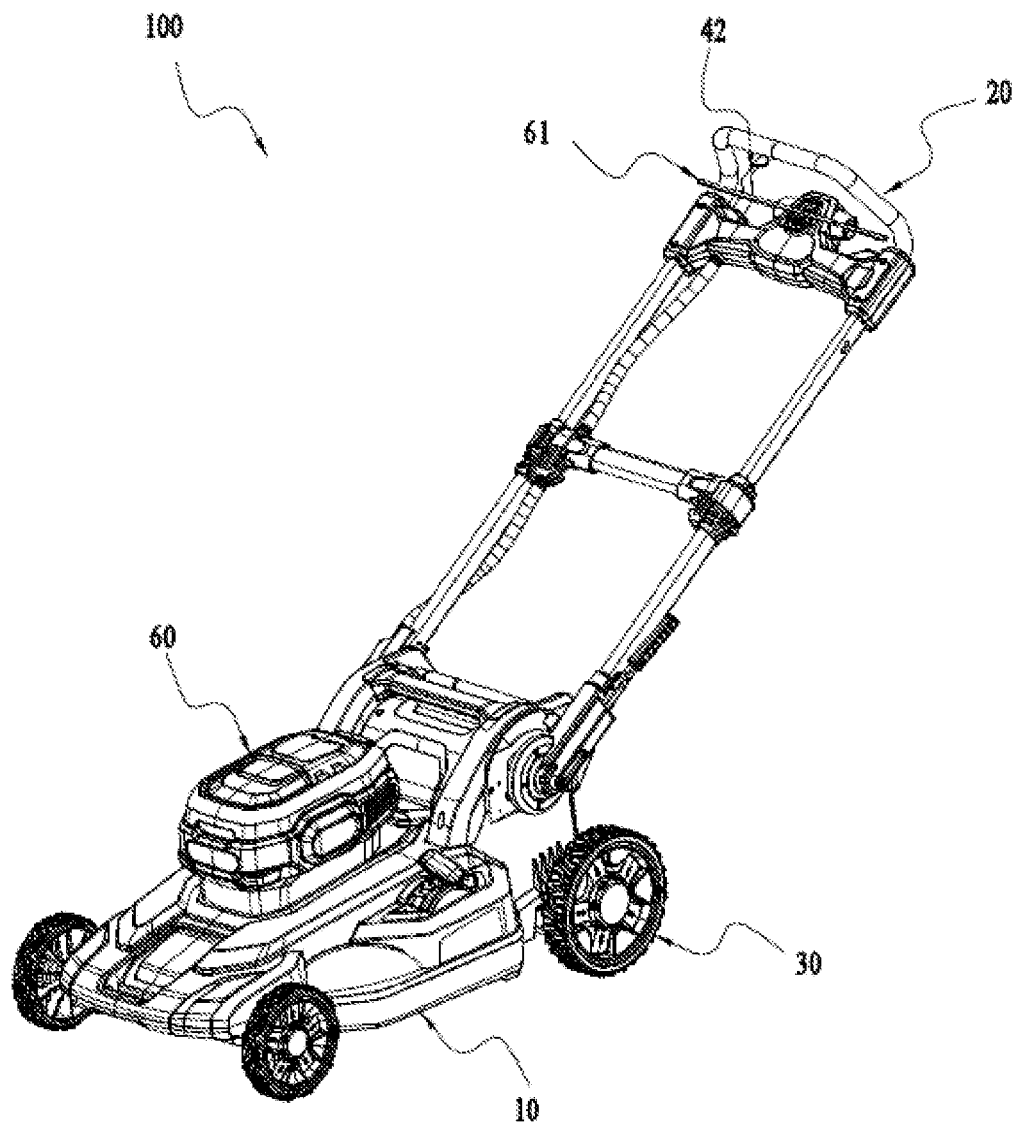
FIG. 1 is a perspective view of an example walk-behind machine of the present disclosure.
Figure 2:
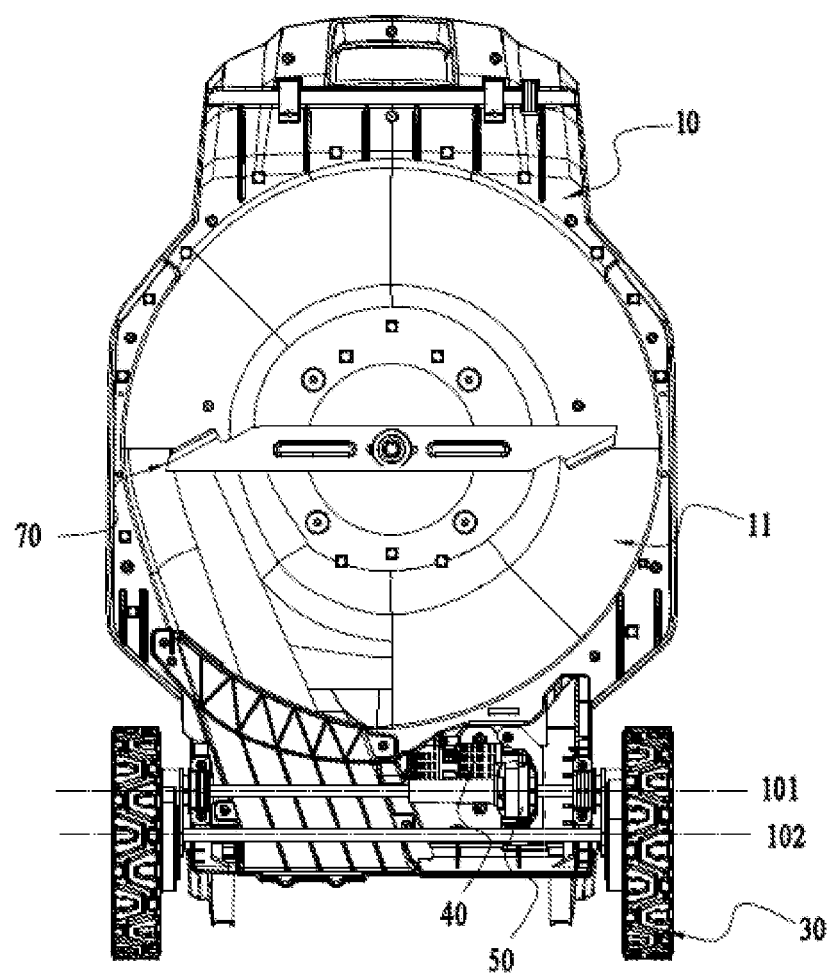
FIG. 2 is a schematic view of a chassis, a motor, a transmission mechanism and a plurality of wheels of the walk-behind machine of FIG. 1.
Figure 3:
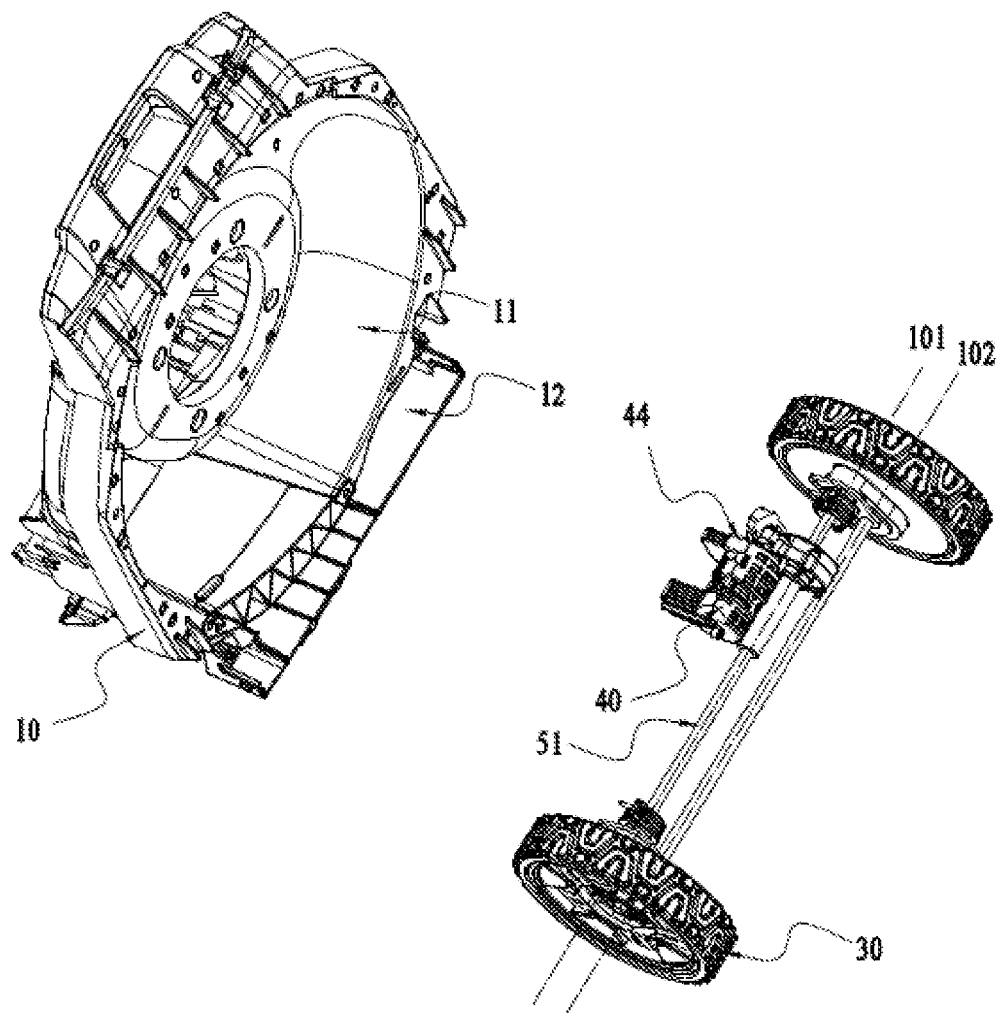
FIG. 3 is a schematic view of the transmission mechanism separated from the chassis of FIG. 2.
Figure 4:
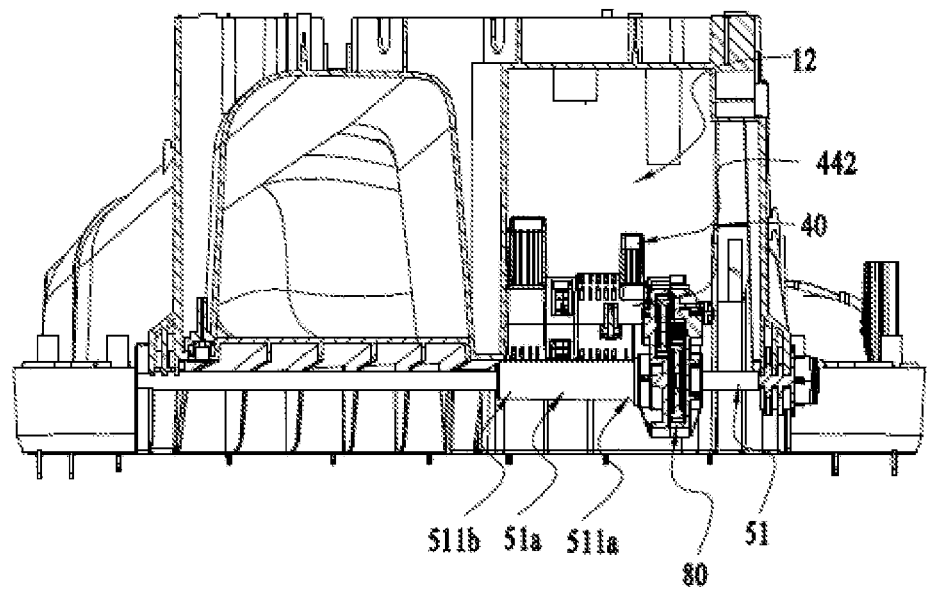
FIG. 4 is a schematic view of an example motor protection shield located in a motor receiving slot of FIG. 2.
Figure 5:
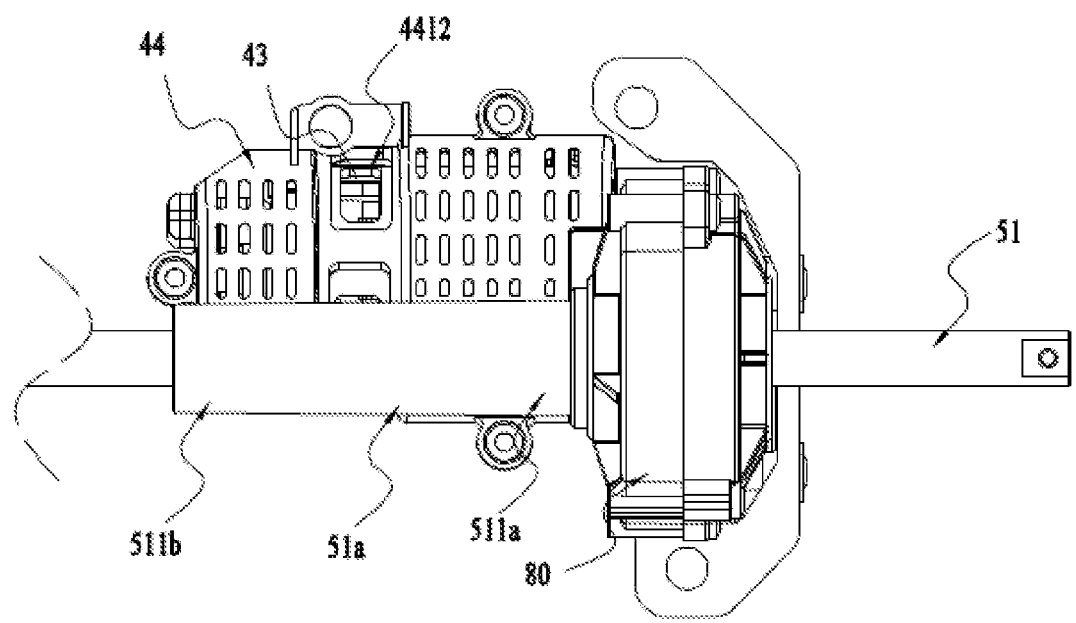
FIG. 5 is a schematic view of an example anti-wrap and an example gearbox of FIG. 4.
Figure 6:
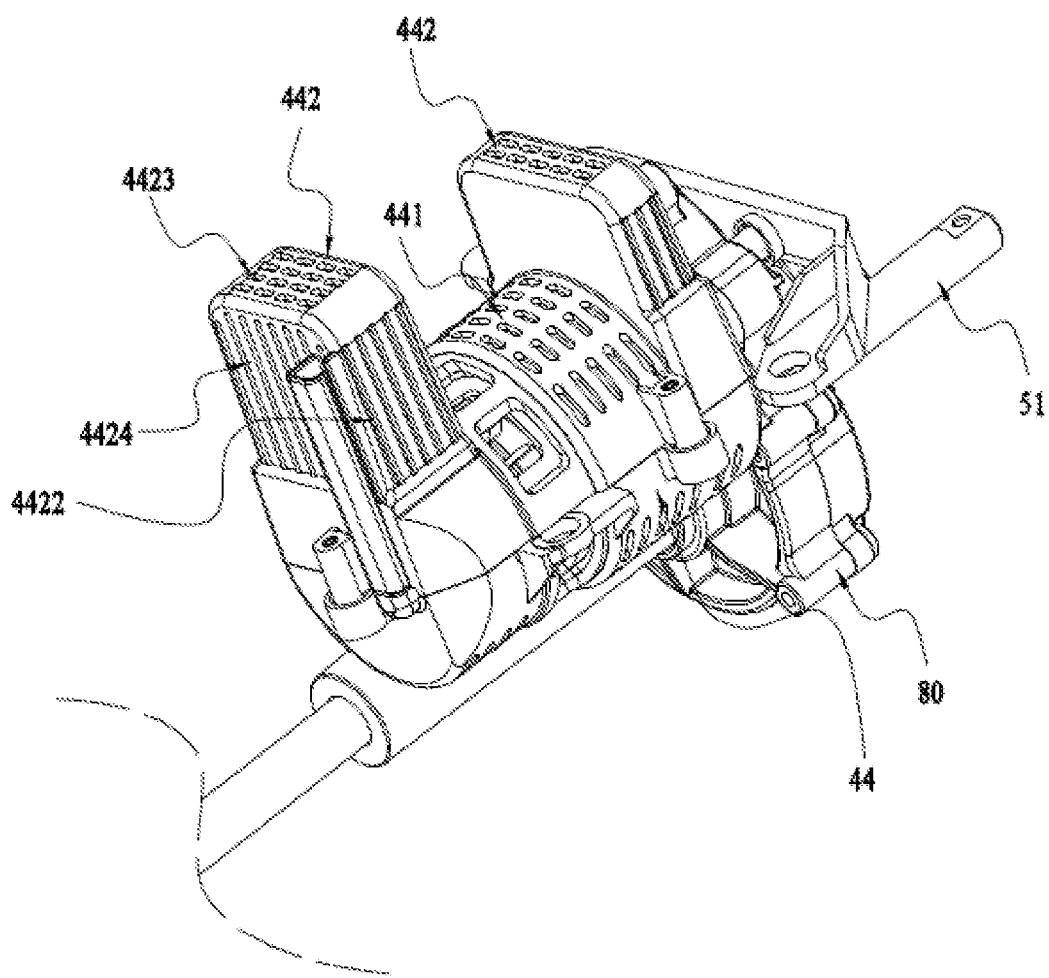
FIG. 6 is a schematic view of the motor protection shield of the walk-behind machine of FIG. 1.
Figure 7:
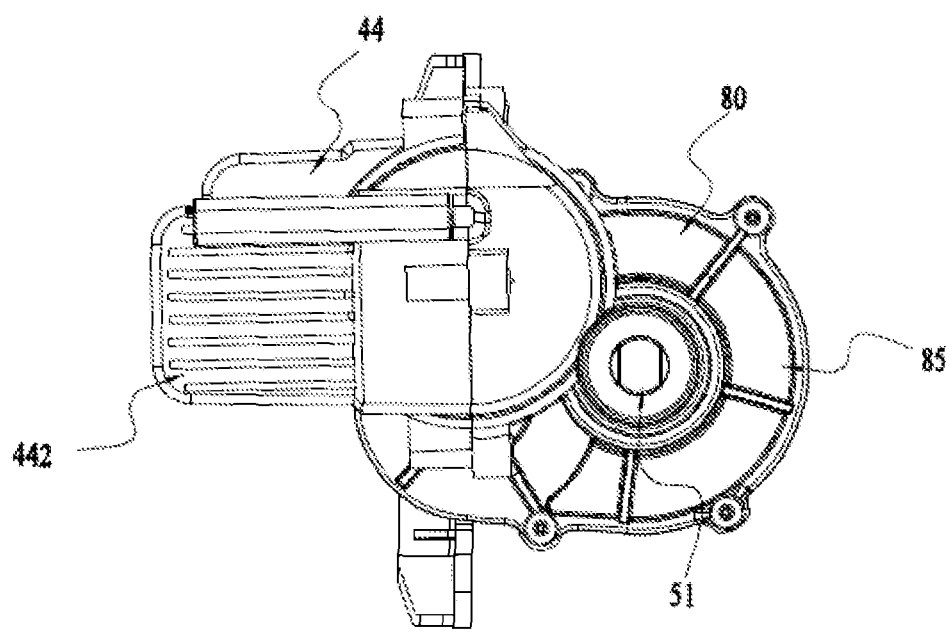
FIG. 7 is a schematic view of another perspective of the structure of FIG. 6.
Figure 8:
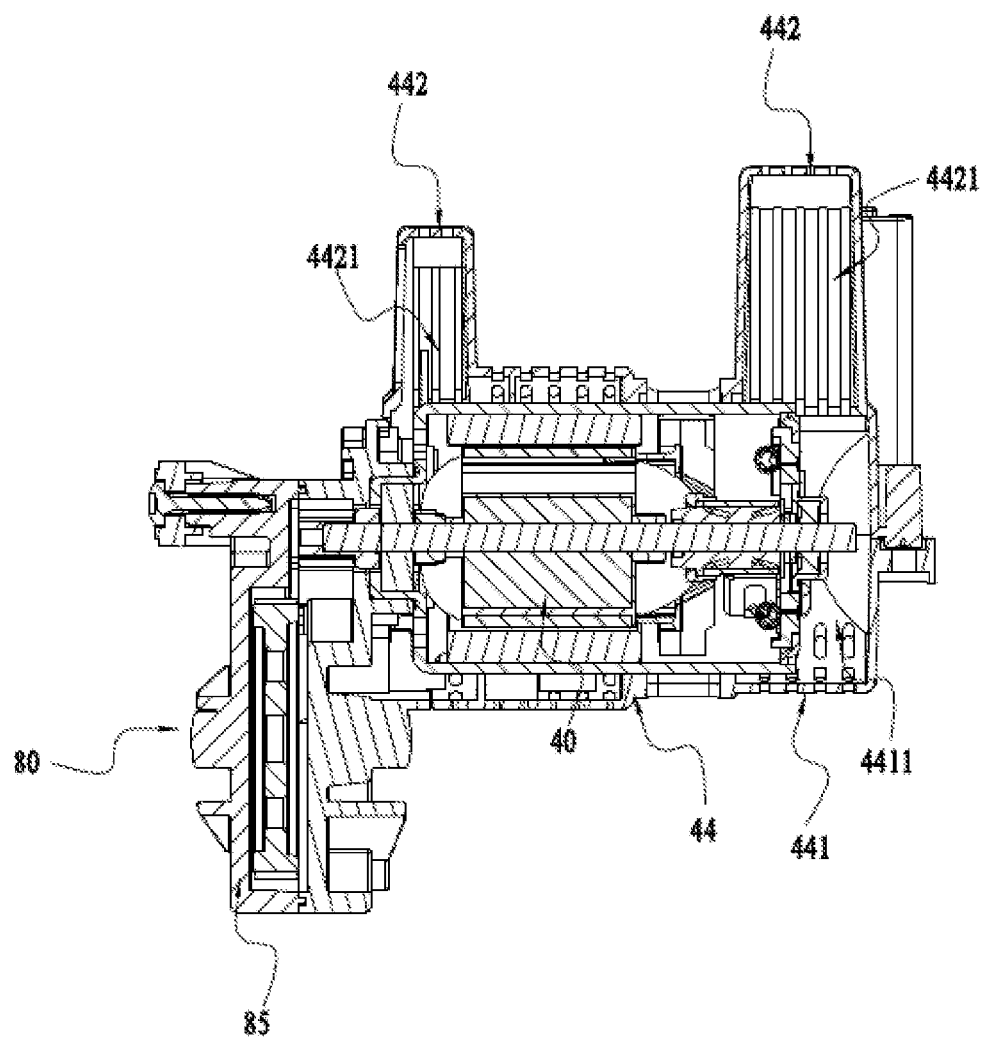
FIG. 8 is a cross-sectional view of the structure of FIG. 6.

As shown in FIG. 1 through FIG. 3, a walk-behind machine 100 includes a chassis 10, a handle 20, a plurality of wheels 30, a first motor 40, and a transmission mechanism 50. The walk-behind machine 100 may also be called a power tool.

The chassis 10 is used to mount the first motor 40. The plurality of wheels 30 are used to support the chassis 10. As the plurality of wheels 30 contact the ground and rotate around a first axis 102 relative to the chassis 10, the walk-behind machine 100 rotate relative to the ground. The handle 20 is coupled to the chassis 10. Users can push the handle 20 to move the chassis 10 relative to the ground, thereby moving the walk-behind machine 100 relative to the ground. Users can control the walk-behind machine 100 by manipulating the handle 20.

The first motor 40 includes a motor shaft 41. The first motor 40 is capable of driving the plurality of wheels 30 to rotate. The motor shaft 41 is used for outputting a driving force to the plurality of wheels 30. The motor shaft 41 rotates around a rotation axis 103 which is parallel to the first axis 102. The motor shaft 41 drives the plurality of wheels 30 to rotate. In the illustrated example, the first motor 40 is an electronic motor and the motor shaft 41 is an electronic motor shaft. The first motor 40 may also be called a self-propelling motor. The walk-behind machine 100 also includes a battery pack that powers the first motor 40. As an alternative example, the first motor 40 may also be an internal combustion engine powered by fuel combustion.

The transmission mechanism 50 transmits power between the first motor 40 and the plurality of wheels 30. The transmission mechanism 50 connects the motor shaft 41 and the plurality of wheels 30 and transmits motion between the motor shaft 41 and the plurality of wheels 30.

The transmission mechanism 50 transfers motion in one-way between the motor shaft 41 and the plurality of wheels 30. The transmission mechanism 50 drives the plurality of wheels 30 to rotate as the motor shaft 41 actively rotates. The transmission mechanism 50 includes a clutch 50a. The clutch 50a has a drive state and an unlocked state. In the driving state, the motor shaft 41 drives the plurality of wheels 30 to rotate; in the unlocked state, the plurality of wheels 30 are free to rotate relative to the motor shaft 41.

When the first motor 40 is in an off state, if the walk-behind machine 100 is pushed to make the plurality of wheels 30 rotate by a certain angle in any direction, the clutch 50a will turn to the unlocked state. That means the clutch 50a can be unlocked when the walk-behind machine 100 is pushed forward or backward to rotate the plurality of wheels 30 clockwise or counterclockwise.

The transmission mechanism 50 can realize the "unlocking" by rotating the plurality of wheels 30 in any direction, thus it is convenient and quick for operation.

The walk-behind machine 100 has a self-driving forward mode and a self-driving backward mode. In the self-driving forward mode, the rotation speed of the plurality of wheels 30 is greater than that of the plurality of wheels 30 in the self-driving backward mode.

As an alternative example, the walk-behind machine 100 includes two start switches for respectively activating the self-driving forward mode and the self-driving backward mode.

As another alternative example, the walk-behind machine 100 includes a switch that switches between the self-driving forward mode and the self-driving backward mode.

The walk-behind machine 100 has a manually-pushing state and a self-driving state. The walk-behind machine 100 can be conveniently manually pushed forward or backward in the manually-pushing state and be propelled to move by a motor instead of manual pushing force in the self-driving state.

As an alternative example, the walk-behind machine 100 turns into the self-driving forward mode when pushed forward and turns into the self-driving backward mode when pushed backward. As an alternative example, the walk-behind machine 100 is provided with a switch that switches between the manually-pushing state and the self-driving state.

In the self-driving forward mode, the first motor 40 drives the plurality of wheels 30 to rotate in the first direction and in the self-drive back mode, drives the plurality of wheels 30 to rotate in the second direction opposite to the first direction.

When the first motor 40 is turned off to make the walk-behind machine 100 exit the self-driving forward mode and the walk-behind machine 100 is pushed forward to rotate the plurality of wheels 30 in the first direction, the clutch 50a turns into the unlocked state. The walk-behind machine 100 can enter the manually-pushing state automatically, not by users' additional operations such as operating an unlock trigger or unlocking switch to unlock the clutch 50a.

When the self-propelling motor is turned off to make the walk-behind machine 100 exit the self-driving backward mode and the walk-behind machine 100 is pushed backward to rotate the plurality of wheels 30 in the second direction, the clutch 50a turns into the unlocked state. The walk-behind machine 100 can enter the manually-pushing state automatically, not by users' additional operations such as operating an unlock trigger or unlocking switch to unlock the clutch 50a. The self-propelling motor is turned off to make the walk-behind machine 100 exit the self-driving forward mode which means the self-propelling motor does not continue to drive the plurality of wheels 30 to rotate in the first direction. The self-propelling motor is turned off to make the walk-behind machine 100 exit the self-driving backward mode which means the self-propelling motor does not continue to drive the plurality of wheels 30 to rotate in the second direction.

After the first motor 40 is turned on, the walk-behind machine 100 can enter the self-driving state and can also easily switch between the manually-pushing state and the self-driving state.

When the first motor 40 is turned off to make the walk-behind machine 100 exit the self-driving forward mode, the walk-behind machine 100 is pushed backward to rotate the plurality of wheels 30 in the second direction and the clutch 50a turns into the unlocked state. When the first motor 40 is turned off to make the walk-behind machine 100 exit the self-driving backward mode, the walk-behind machine 100 is pushed forward to rotate the plurality of wheels 30 in the first direction and the clutch 50a turns into the unlocked state When the walk-behind machine 100 exits the self-driving forward mode, the first motor 40 is turned off. The clutch 50a can turn into the unlocked state when the walk-behind machine 100 is pushed to drive the plurality of wheels 30 to rotate in any direction. That is, the clutch 50a can turn into the unlocked state when the walk-behind machine 100 is pushed forward or backward to drive the plurality of wheels 30 to rotate in the first or second direction.

When the walk-behind machine 100 exits the self-driving backward mode, the first motor 40 is turned off. The clutch 50a can turn into the unlocked state when the walk-behind machine 100 is pushed to drive the plurality of wheels 30 to rotate in any direction. That is, the clutch 50a can turn into the unlocked state when the walk-behind machine 100 is pushed forward or backward to drive the plurality of wheels 30 to rotate in the first or second direction.

The walk-behind machine 100 includes a working element 70. The working element 70 is used to perform the functions of the walk-behind machine 100. In the illustrated example, the working element 70 is a mowing blade and the walk-behind machine 100 is a lawn mower. The chassis 10 forms a cutting cavity 11. The mowing blade rotates within the cutting cavity 11. As another example, the working element 70 is an auger and the walk-behind machine 100 is a snow thrower.

In the illustrated example, the working element 70 and the plurality of wheels 30 are respectively driven by different motors. The walk-behind machine 100 includes a second motor 60, and the second motor 60 is mounted to the chassis 10. The second motor 60 drives the working element 70. The second motor 60 may be an internal combustion engine powered by fuel combustion or a motor powered by electricity. In this example, the second motor 60 is an electronic motor. The battery pack supplies power to the second motor 60 and the first motor 40. As shown in FIG. 1, the walk-behind machine 100 includes a power trigger 61 and a drive trigger 42. The power trigger 61 is used to activate the second motor 60 and the drive the trigger 42 is used to activate the first motor 40. The walk-behind machine 100 may be a lawn mower and the second motor 60 can be called a mowing motor which drives the mowing blade to rotate. When the mowing motor is powered by electricity, the mowing motor can also be called a mowing electric motor.

As an alternative example, the working element and the wheels can be driven by the same motor. That is, a motor, such as the first motor 40, drives the working element and also drives the wheels.

Figure 11:
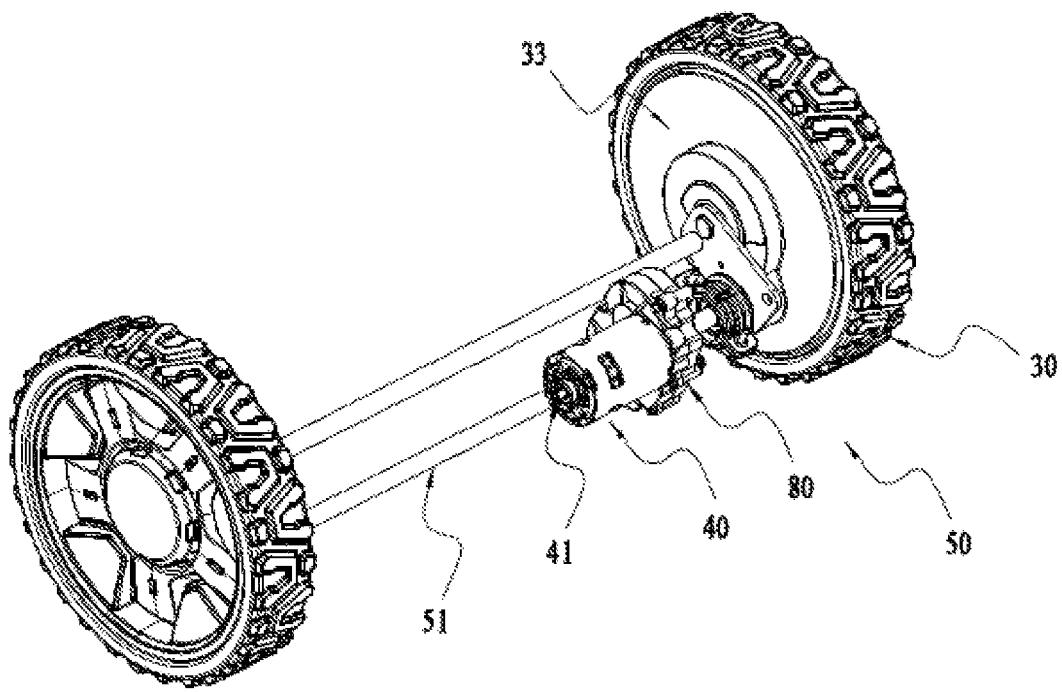
FIG. 11 is a schematic view of the motor, the transmission mechanism and the plurality of wheels of the walk-behind machine of FIG. 1.
Figure 12:
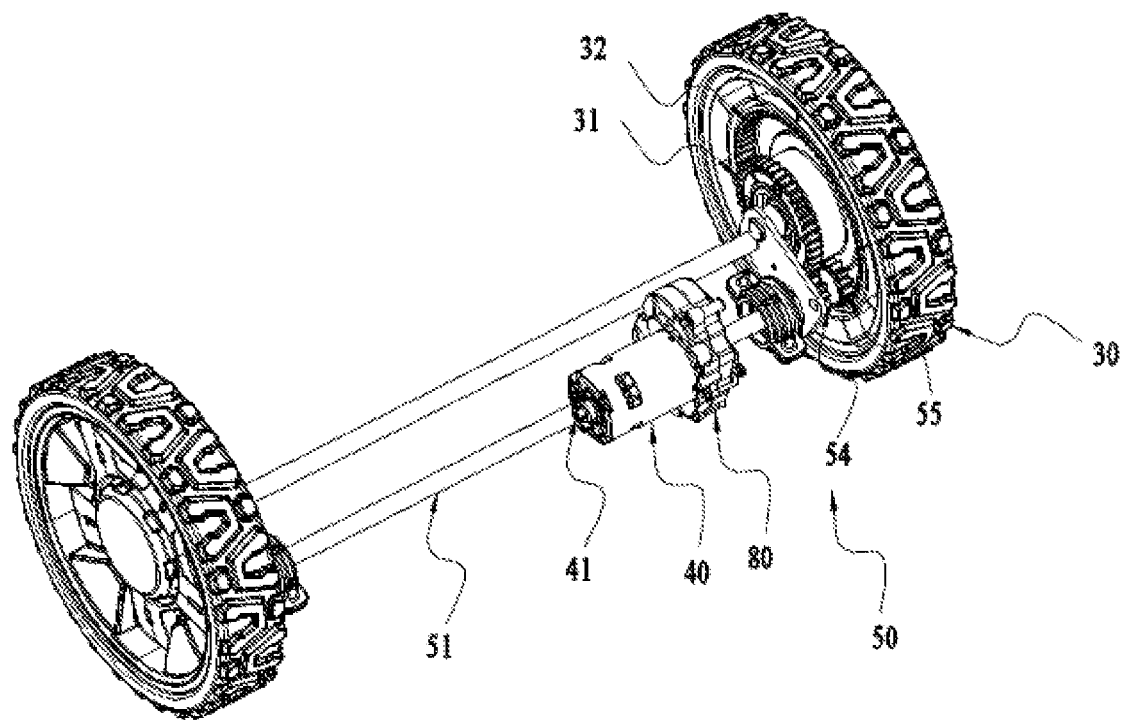
FIG. 12 is a schematic view of the structure of FIG. 11 after removing a wheel cover.
Figure 13:
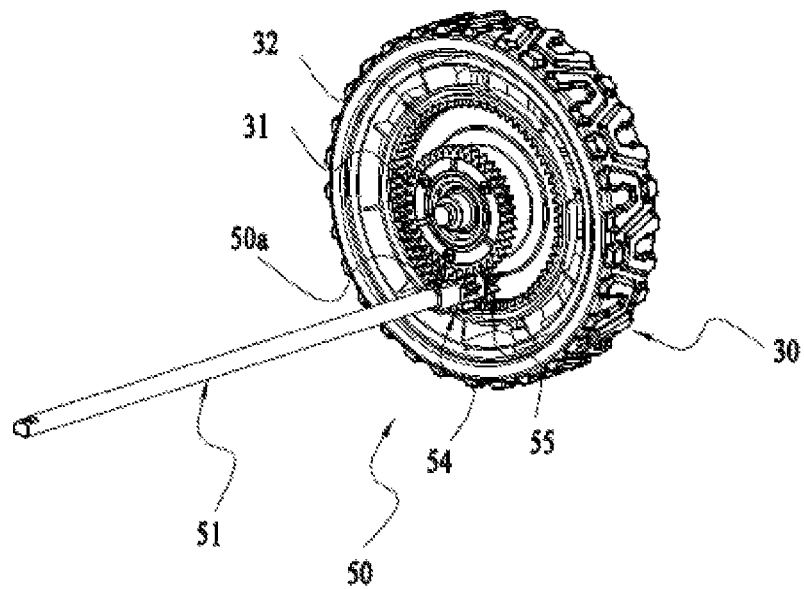
FIG. 13 is a schematic view showing an example first transmission gear and an example second transmission gear of the transmission mechanism of FIG. 12 respectively engaged with a first wheel gear and a second wheel gear.
Figure 14:
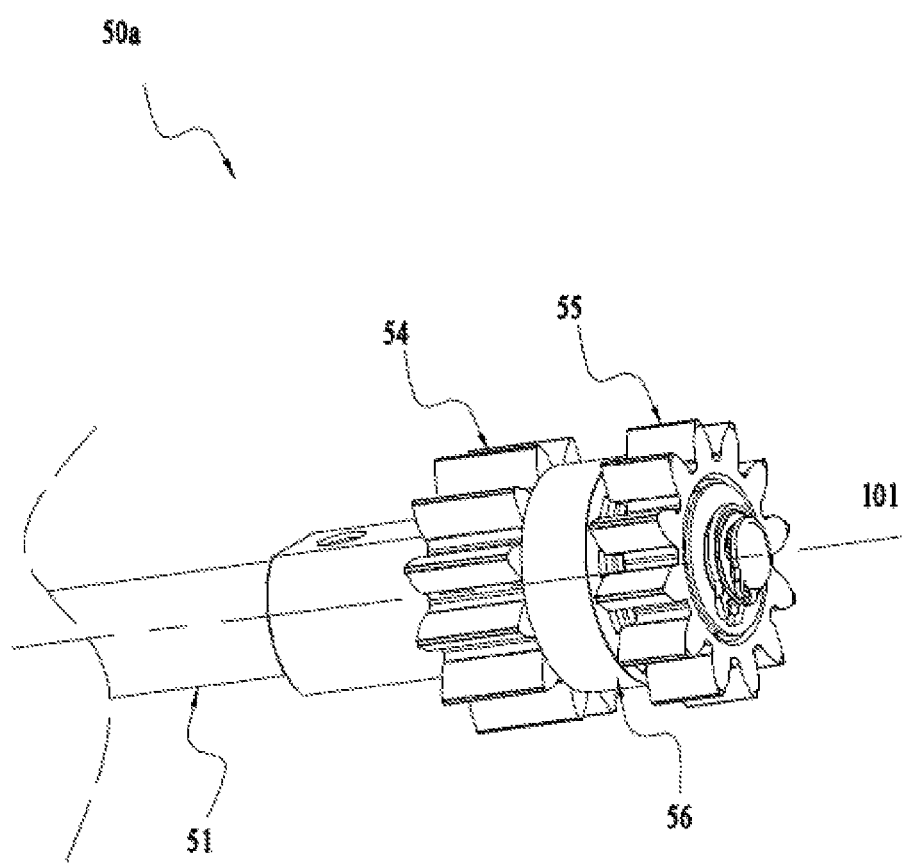
FIG. 14 is a schematic view of the transmission mechanism of FIG. 13.
Figure 15:
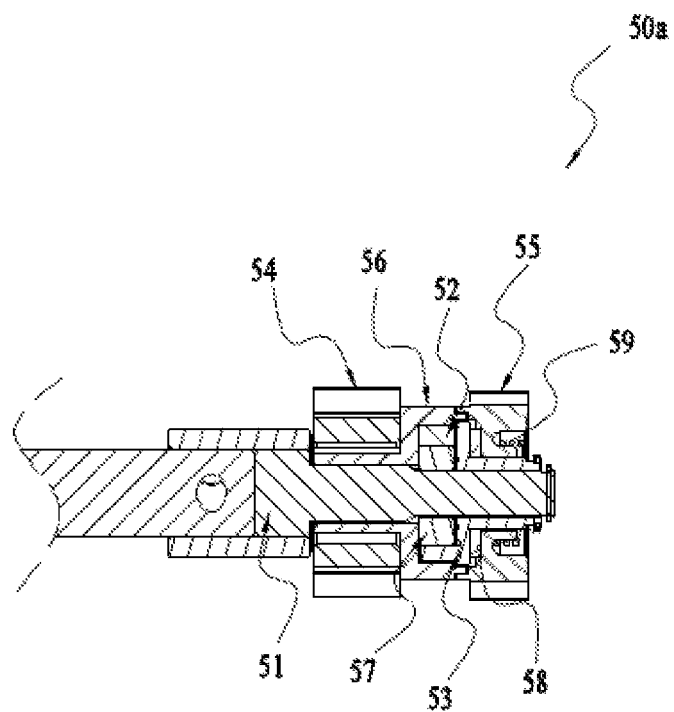
FIG. 15 is a cross-sectional view of the transmission mechanism of FIG. 14.
Figure 16:
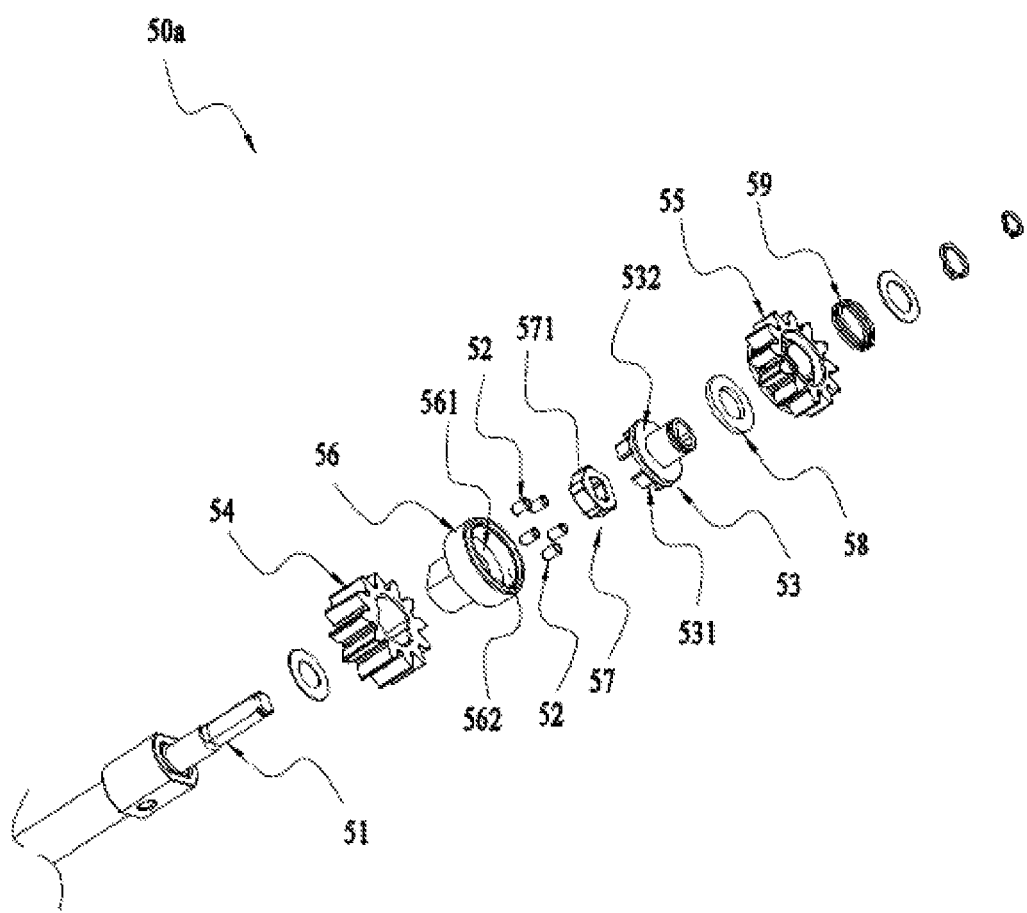
FIG. 16 is an exploded view of the transmission mechanism of FIG. 14.
Figure 17:
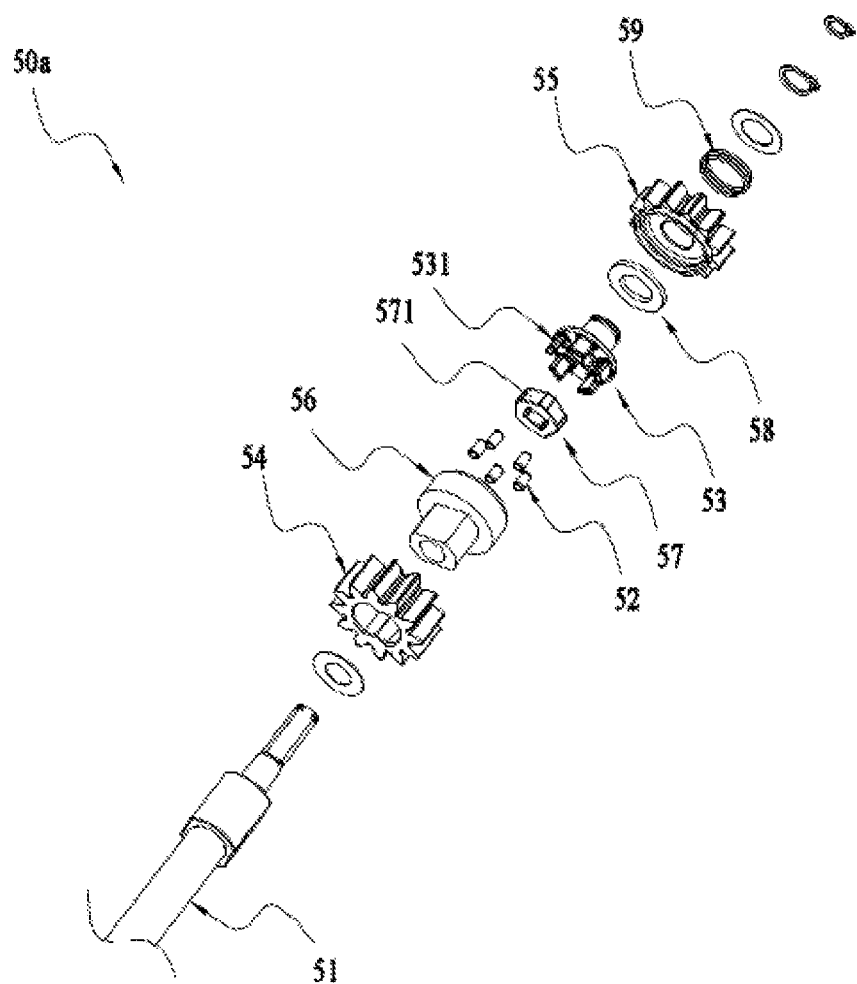
FIG. 17 is an exploded view of another perspective of the transmission mechanism of FIG. 14.
Figure 18:
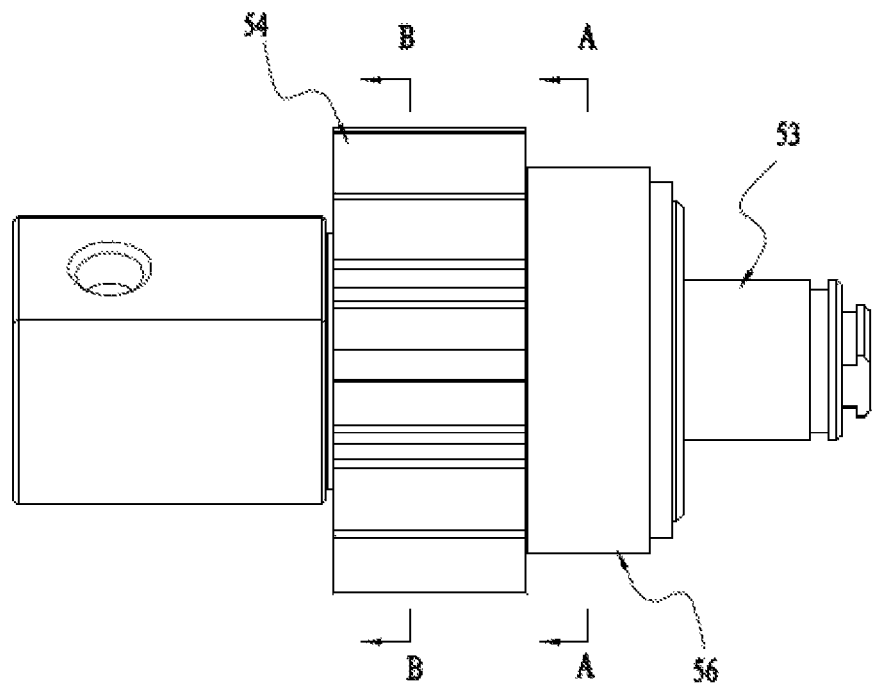
FIG. 18 is a schematic view of the first transmission gear, an outer ring member and a driving member of the transmission mechanism of FIG. 14.
Figure 19:
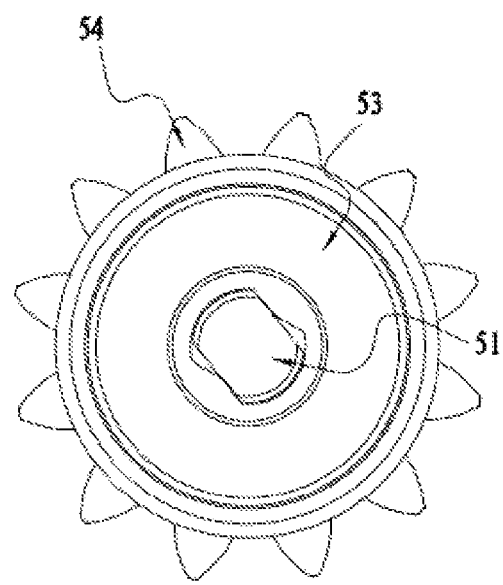
FIG. 19 is a plan view of another perspective of the structure of FIG. 18.

As shown in FIG. 11 to FIG. 13, a first wheel gear 31 is mounted and fixed to the plurality of wheels 30. The first wheel gear 31 is fixedly coupled to the plurality of wheels 30 to drive the plurality of wheels 30 to rotate. A second wheel gear 32 is mounted and fixed to the plurality of wheels 30. The first wheel gear 31 and second wheel gear 32 rotate in synchronization with the plurality of wheels 30. The walk-behind machine 100 also includes a wheel cover 33. The plurality of wheels 30 form a cavity in which the first wheel gear 31 and the second wheel gear 32 are located. The cavity is provided with an opening which is covered by the wheel cover 33 to prevent dust from entering the cavity to contaminate the first wheel gear 31 and the second wheel gear 32.

As another example, the first wheel gear may also be a part of the wheels, that is to say, be formed with the wheels. The second wheel gear may also be a part of the wheels, that is to say, be formed with the wheels.

The transmission mechanism 50 includes the clutch 50a and a gearbox 80. As shown in FIG. 12 to FIG. 17, the clutch 50a includes a transmission shaft 51, a movable member 52, a driving member 53, and an outer ring member 56.

Figure 9:
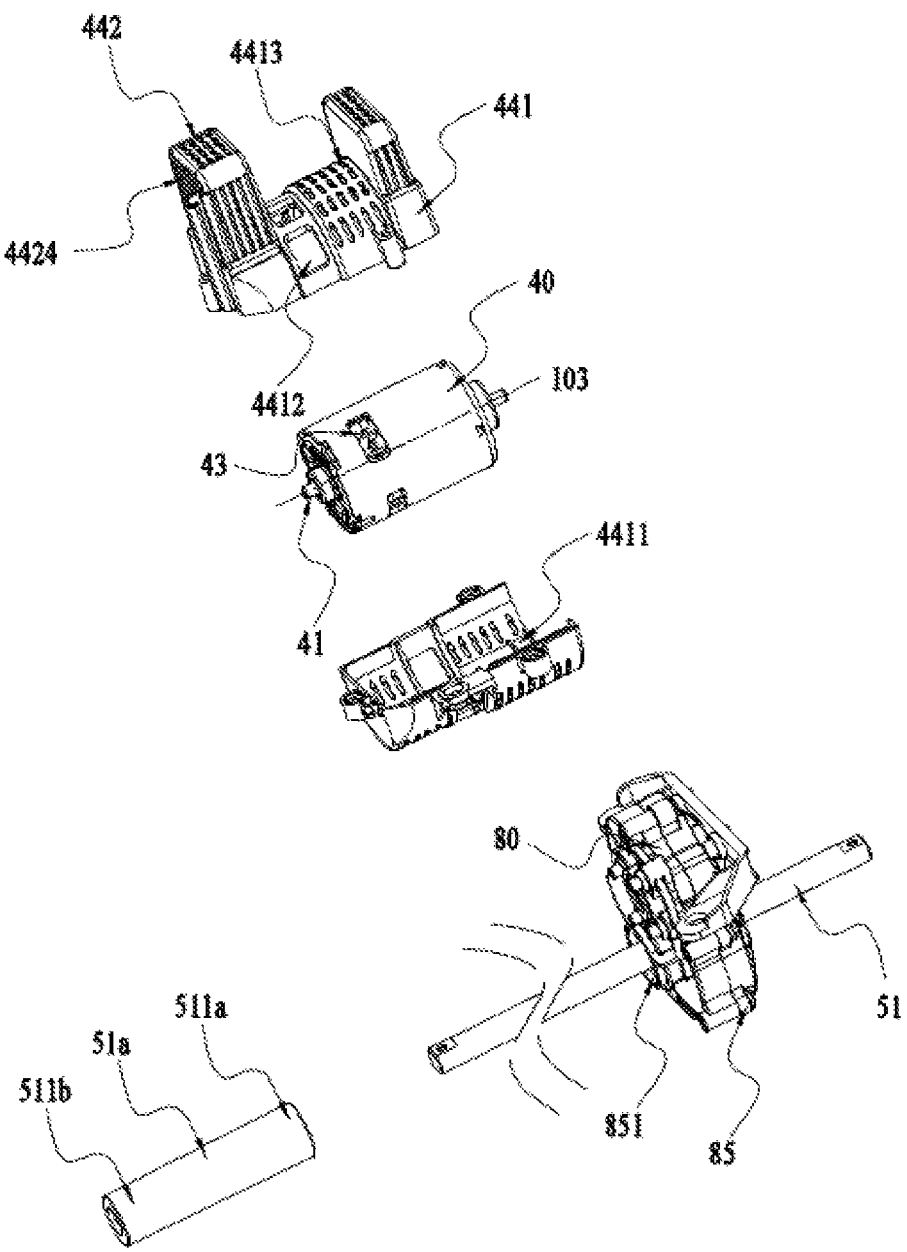
FIG. 9 is an exploded view of the structure of FIG. 6.
Figure 10:
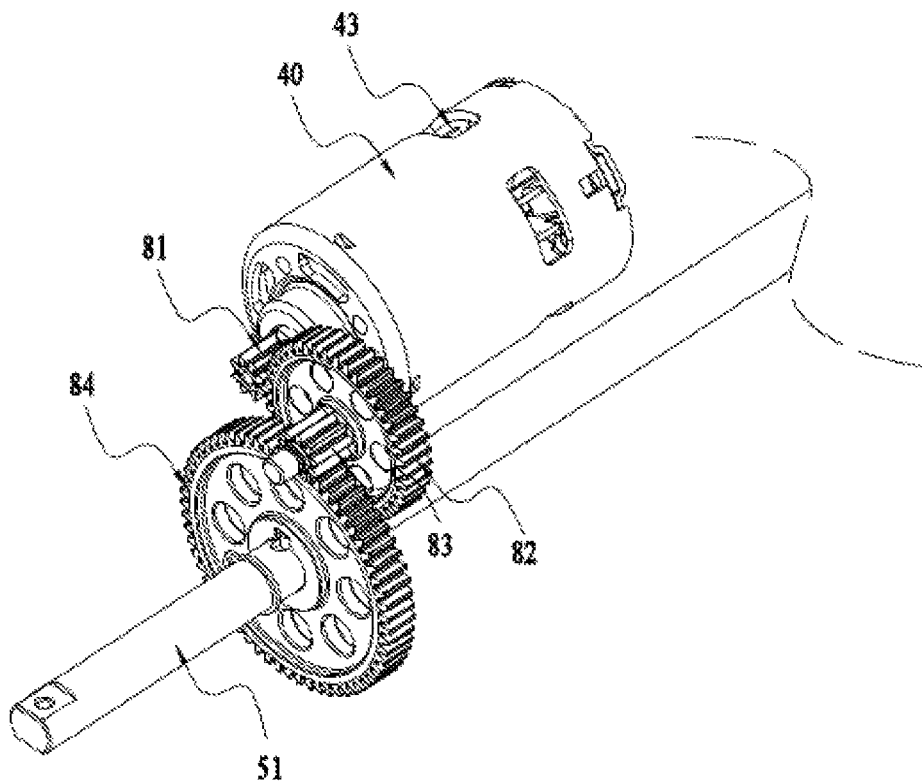
FIG. 10 is a schematic view showing the internal structure of the gearbox of the walk-behind machine of FIG. 1.

The transmission shaft 51 is driven to rotate by the motor shaft 41 and then drives the plurality of wheels 30 to rotate. The gearbox 80 connects the transmission shaft 51 and the motor shaft 41 to make the motor shaft 41 drive the transmission shaft 51 to rotate and the rotation speed of the transmission shaft 51 is lower than the rotation speed of the motor shaft 41. As shown in FIG. 9 and FIG. 10, the gearbox 80 includes a first driving gear 81, a first driven gear 82, a second driving gear 83, a second driven gear 84, and an outer housing 85. The first driving gear 81 is fixed to the motor shaft 41. The first driven gear 82 meshes with the first driving gear 81. The first driven gear 82 and the second driving gear 83 rotate coaxially. The second driving gear 83 and the second driven gear 84 mesh with each other. The second driven gear 84 is fixed to the transmission shaft 51.

As shown in FIGS. 12-19, the transmission mechanism 50 further includes a first transmission gear 54, a second transmission gear 55, a fixing member 57, a friction member 58, and an elastic member 59.

The first transmission gear 54 meshes with and rotates in synchronization with the first wheel gear 31. When the first motor 40 is working or the motor shaft 41 rotates actively, the transmission shaft 51 is driven to rotate and then drives the first transmission gear 54 to rotate, which further drives the plurality of wheels 30 to rotate. The second transmission gear 55 meshes with and rotates in synchronization with the second wheel gear 32. When the plurality of wheels 30 rotate, the first transmission gear 54 and the second transmission gear 55 rotate in opposite directions, and the second transmission gear 55 exerts a force opposite to the rotation direction of the first transmission gear 54 to the driving member 53.

In the illustrated example, the first wheel gear 31 is an external gear, the second wheel gear 32 is an internal gear, the first transmission gear 54 is an external gear, and the second transmission gear 55 is an external gear. The transmission shaft 51 rotates about a central axis 101. The rotation axis 103 of the motor shaft is parallel to the central axis 101. The central axis 101 is parallel or coincident with the first axis 102. The first transmission gear 54 and the second transfer gear 55 rotate about the central axis 101. The rotational axis of the first transmission gear 54 coincides with the rotational axis of the second transmission gear 55 so that the transmission mechanism 50 is compact.

Figure 20:
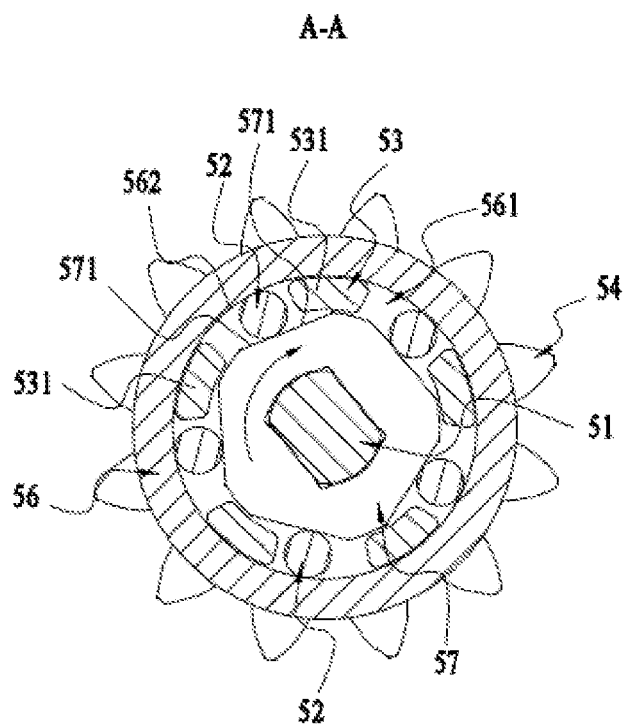
FIG. 20 is a cross-sectional view of the structure of FIG. 18 along line A-A.
Figure 21:
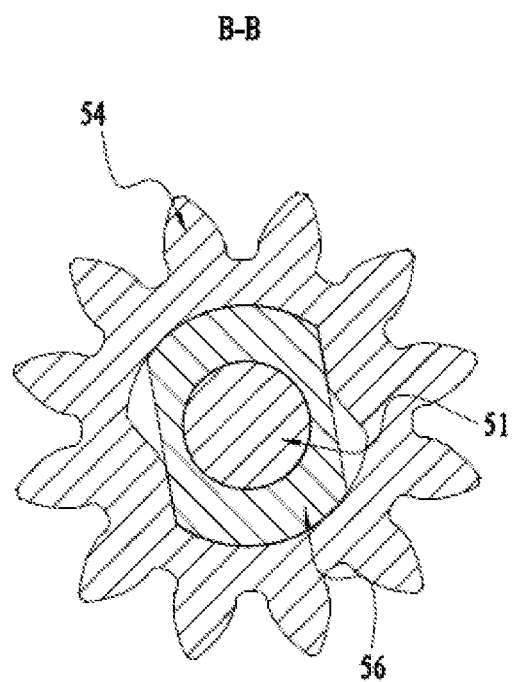
FIG. 21 is a cross-sectional view of the structure of FIG. 18 along line B-B.
Figure 22:
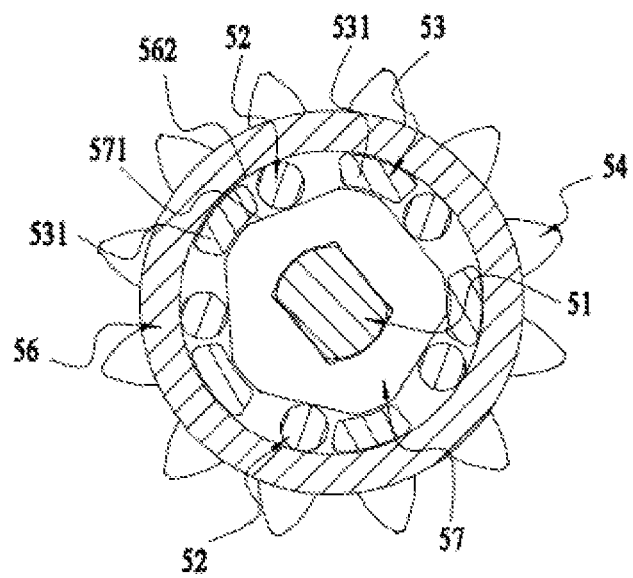
FIG. 22 is a schematic view of the movable member of FIG. 20 in an unlocked position.
Figure 23:
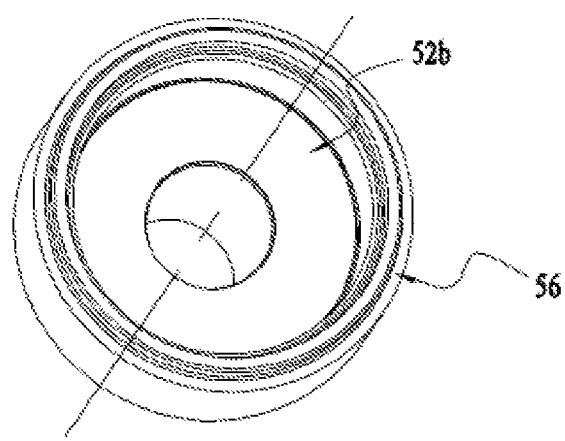
FIG. 23 is a schematic view of the outer ring member, a plurality of magnets and a spacer of FIG. 16.
Figure 24:
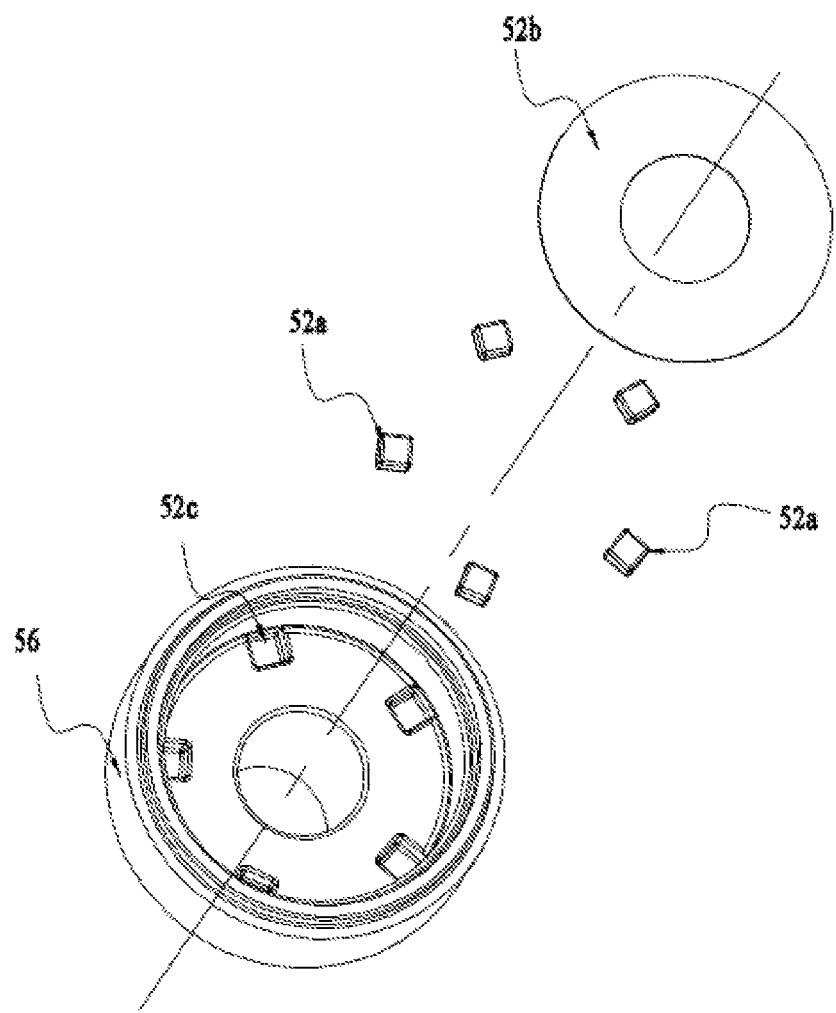
FIG. 24 is an exploded view of the structure of FIG. 23.

The movable member 52 is movable between a locked position and an unlocked position relative to the transmission shaft 51. The movable member 52 may be pins. The movable member 52 in FIG. 20 is in the locked position. The movable member 52 in FIG. 22 is in the unlocked position. The transmission shaft 51 drives the plurality of wheels 30 to rotate when the movable member 52 is in the locked position. The plurality of wheels 30 are free to rotate relative to the transmission shaft 51 when the movable member 52 is in the unlocked position, that is, the transmission shaft 51 is not driven to rotate whether the plurality of wheels 30 rotate clockwise or counterclockwise.

The driving member 53 is driven by the plurality of wheels 30 to make the movable member 52 move between the locked position and the unlocked position. The driving member 53 is driven by the plurality of wheels 30 to drive the movable member 52 to move from the locked position to the unlocked position.

As an example, when the plurality of wheels 30 rotate, the second transmission gear 55 is driven to rotate by the second wheel gear 32. The transmission between the second transmission gear 55 and the driving member 53 is a friction transmission such that the second transmission gear 55 drives the driving member 53 to move to make the movable member 52 move between the locked position and the unlocked position.

The transmission between the plurality of wheels 30 and the driving member 53 is a friction transmission. The plurality of wheels 30 exert a force opposite to the rotation direction of the first transmission gear 54 to the driving member 53. The friction member 58, realizing the friction transmission between the plurality of wheels 30 and the driving member 53, is disposed between the second transmission gear 55 and the driving member 53. The elastic member 59 exerts a force to the second transmission gear 55 to cause the driving member 53 and the second transmission gear 55 to clamp the friction member 58. The driving member 53 includes a friction portion 532 which is in contact with the friction member 58 to transmit a frictional force.

As an alternative example, the second wheel gear, the second transmission gear and the friction member may not be removed and the wheels contact the driving member directly and exert a force opposite to the rotation direction of the first transmission gear to the driving member directly to realize the friction transmission between them.

In the illustrated example, the fixing member 57 is coupled to and rotates in synchronization with the transmission shaft 51. The fixing member 57 forms a driving surface 571. The fixing member 57 is separately provided to help mount and remove the transmission mechanism 50. As another alternative example, the transmission mechanism may also be provided without a fixing member, and the driving surface, as part of the transmission shaft, is formed with the transmission shaft.

The outer ring member 56 is sleeved on the transmission shaft 51. The outer ring member 56 forms a mounting groove 561 which accommodates the fixing member 57 and the movable member 52. The movable member 52 are pins. A plurality of pins is disposed in the mounting groove 561. The number of the driving surfaces is the same as in number as that of the pins. The pins are located between the groove wall 562, an annular surface, of the mounting groove 561 and the transmission shaft 51.

In the illustrated example, as shown in FIG. 16, FIG. 17, FIG. 23 and FIG. 24, the power tool includes magnets 52a. The magnets 52a exert a magnetic attractive force to the movable member 52. The magnets 52a exert an attractive force in the direction of the central axis 101 to the pins.

The magnets 52a reduce the noise generated during the moving of the movable member 52. The magnets 52a make the movable member 52 less likely to topple or deflect during the movement to prevent the clutch 50a from being accidentally locked, keeping transmission reliable.

The number of magnets 52a is equivalent to the number of pins. A plurality of magnets 52a are evenly distributed in the circumferential direction of the central axis 101.

During the movement of the pins, each pin is subjected to the same force of the magnets, which keeps the transmission reliable. As another alternative example, the magnets may be annular.

The power tool also includes spacer 52b. The spacer 52b is located between the pins and the magnets 52a and disposed in the mounting groove 561. The spacer 52b enables the pin to move smoothly within the mounting groove 561. One end of the pin is in contact with the spacer 52b. The outer ring member 56 forms recesses 52c in which the magnets 52a are disposed.

Figure 25:
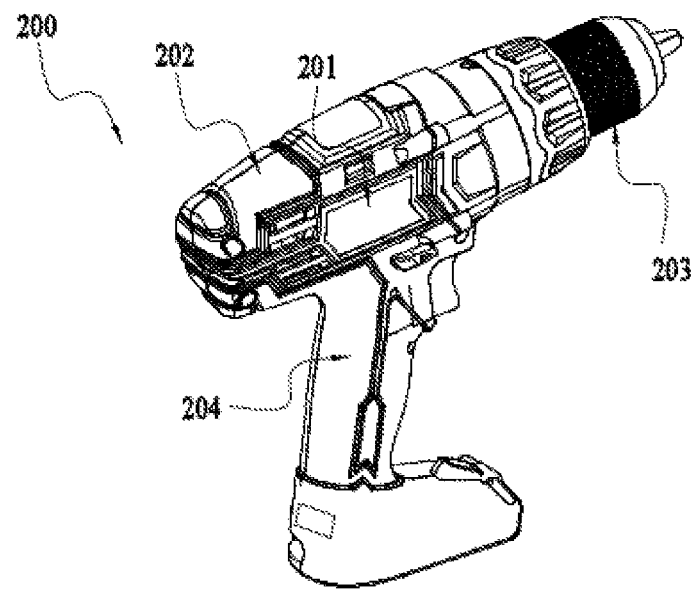
FIG. 25 is a schematic view of another power tool.
Figure 26:
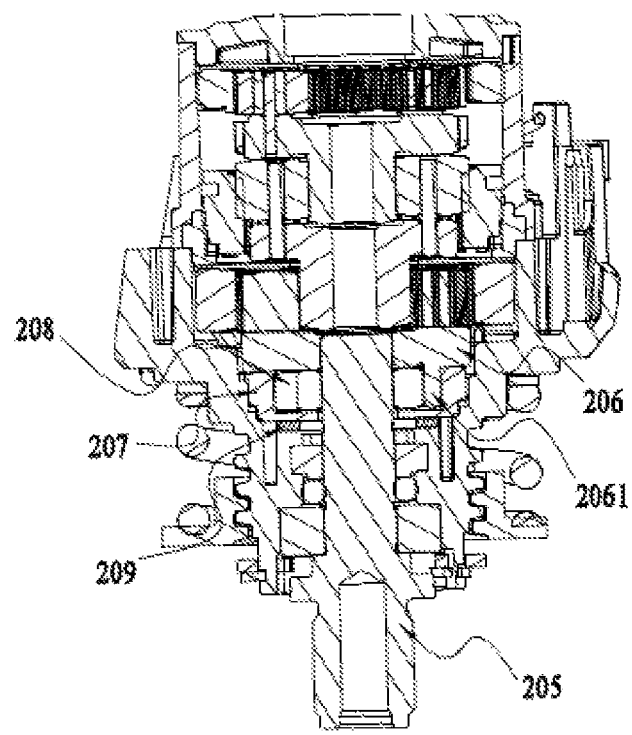
FIG. 26 is a schematic illustration of a transmission shaft, the outer ring member, a plurality of pins and the plurality of magnets of the power tool of FIG. 25.

As an alternative example, the outer ring member is located between the pins and the magnets in the direction of the central axis. That is, the magnets are disposed outside the mounting groove. As an example, as shown in FIG. 25 and FIG. 26, the power tool 200 includes a motor 201, a housing 202, and a work head 203. The motor 201 drives the working head 203 to rotate. The working head 203 is used to mount a working element. The housing 202 forms a handle 204 for users to hold. The power tool 200 includes a clutch. The clutch includes a transmission shaft 205, a driving member 206, an outer ring member 207, pins 208, and magnets 209. The driving member 206 includes a plurality of driving portions 2061. The driving member 206, the outer ring member 207 and the pins 208 respectively have the same structure and the same mounting way with the driving member, the outer ring member and the pins of the power tool shown in FIG. 1 to FIG. 24. The power tools in FIG. 25 and FIG. 26 are hammer and drill tools. The clutch is also called a shaft-lock structure. The clutch of FIG. 25 and FIG. 26 differs from the clutch of FIG. 1 to FIG. 24 in structure and in the mounting way of the magnets. The magnets 209 may be annular and surround the transmission shaft 51. The magnets 209 are located outside the mounting groove and are fixed to the outer ring member 207. The outer ring member 207 is located between the pins and the magnets 209.

The first transmission gear 54 is mounted to the outer ring member 56, and the outer ring member 56 drives the first transmission gear 54 to rotate. The movable member 52 is disposed between the driving surface 571 and the groove wall 562 of the mounting groove 561. The driving member 53 includes a plurality of driving portions 531. The driving portions 531 get into the mounting groove 561 and contact with the movable member 52 to push the movable member 52 to move. A plurality of driving portions 531 and a plurality of pins are alternatively arranged.

As shown in FIG. 20, the movable member 52 is in the locked position. The movable member 52 is simultaneously in contact with the groove wall 562 and the driving surface 571 of the mounting groove 561.

At this time, the first motor 40 is working and the motor shaft 41 actively rotates. When the transmission shaft 51 rotates in a clockwise direction (the direction indicated by the arrow), the driving surface 571 drives the movable member 52 to rotate in the clockwise direction for driving the outer ring member 56 and the first transmission gear 54 to rotate in the clockwise direction, thereby driving the plurality of wheels 30 to rotate.

As shown in FIG. 18 to FIG. 21, the movable member 52 is located at a locked position capable of simultaneously contacting the driving surface 571 and the groove wall 562 of the mounting groove 561.

When the first motor 40 is working, the motor shaft 41 actively rotates, and at this time, the transmission shaft 51 rotates in a clockwise direction (the direction indicated by the arrow). The movable member 52 simultaneously contacts the groove wall 562 of the mounting groove 561 and the driving surface 571. Thereby, the driving shaft 51 drives the outer ring member 56 to rotate clockwise.

The first transmission gear 54 is sleeved on the outer ring member 56. The transmission between the first transmission gear 54 and the outer ring member 56 is realized through a flat portion. The clockwise rotation of the outer ring member 56 causes the first transmission gear 54 to rotate clockwise. The first transmission gear 54 meshes with the first wheel gear 31 to drive the plurality of wheels 30 to rotate.

When the plurality of wheels 30 rotate, the driving member 53 receives a force, opposite to the rotation direction of the first transmission gear 54, from the plurality of wheels 30. That is, the driving member 53 receives a force in a counterclockwise direction and is driven to the position shown in FIG. 20 by the plurality of wheels 30. At this time, the driving member 53 blocks the movement of the movable member 52, so that the movable member 52 cannot move from the locked position to the unlocked position, or the movable member 52 keeps in the locked position. The rotation of the plurality of wheels 30 drives the second transmission gear 55 to rotate counterclockwise. That is, the plurality of wheels 30 drives the second transmission gear 55 to rotate in a direction opposite to the rotation direction of the first transmission gear 54. The transmission between the second transmission gear 55 and the driving member 53 are friction transmission. The second transmission gear 55 exerts a force to the driving member 53 in a direction opposite to the rotation direction of the first transmission gear 54, and the driving member 53 is in the way of the movable member 52 from the locked position to the unlocked position. The driving member 53 is driven to rotate to the position shown in FIG. 20 by the plurality of wheels 30.

When the movable member 52 is in the locked position and the clutch 50a is in the locked state, and the motor shaft 41 can drive the plurality of wheels 30 to rotate in the first direction to advance the machine. At this time, the walk-behind machine 100 is in the self-driving forward mode. When the first motor 40 is stopped, or in other words, the motor shaft 41 stops rotating and the walk-behind machine 100 was dragged backward, the plurality of wheels 30 actively rotate in a second direction opposite to the first direction and drive the first transmission gear 54 to rotate counterclockwise. The second transmission gear 55 rotates clockwise. The force exerted by the plurality of wheels 30 on the movable member 52 causes the movable member 52 to move from the locked position to the unlocked position. Further, the plurality of wheels 30 can drive the driving member 53 to move, then the driving member 53 drives the movable member 52 move from the locked position to the unlocked position. The plurality of wheels 30 exert a clockwise force to the driving member 53. The transmission between the driving member 53 and the transmission shaft 51 is realized with a flat shaft portion engaging in a flat hole. When the transmission shaft 51 stops rotating, the driving member 53 can rotate relative to the transmission shaft 51. At this time, the driving member 53 rotates by a certain angle under the force of the plurality of wheels 30, and pushes the movable member 52 to move from the locked position to the unlocked position.

When the first motor 40 stops working, the walk-behind machine 100 is pushed forward and the plurality of wheels 30 actively rotate, the plurality of wheels 30 drive the first transmission gear 54 to rotate clockwise. The first transmission gear 54 drives the outer ring member 56 to rotate clockwise. The outer ring member 56 rotates clockwise relative to the transmission shaft 51 to disengage the movable member 52 from the locked position. The driving member 53 can block the movable member 52 from entering the locked position on the other side. At this time, the movable member 52 cannot simultaneously contact the groove wall 562 of the mounting groove 561 and the driving surface 571. The outer ring member 56 is rotatable relative to the transmission shaft 51. That is, the plurality of wheels 30 are rotatable relative to the transmission shaft.

As an alternative example, the first motor 40 has a forward rotation mode and a reverse rotation mode. In the forward rotation mode, the motor shaft 41 rotates in the first direction; in the reverse mode, the motor shaft 41 rotates in the second direction opposite to the first direction. That is, the rotation directions of the motor shaft 41 are opposite in the forward rotation mode and the reverse rotation mode.

Furthermore, the current direction of the first motor 40 in the forward rotation mode is opposite to that in the reverse rotation mode. When walk-behind machine 100 exits the self-driving state, the motor shaft 41 of the first motor 40 enters the reverse rotation mode. The rotation direction of the motor shaft 41 is opposite to that in the self-driving state. The motor shaft 41 actively rotates by a certain angle to rotate the transmission shaft 51 by a certain angle so that the movable member 52 is moved from the locked position to the unlocked position to unlock the clutch. When the walk-behind machine 100 is stopped from traveling suddenly by a large resistance in the self-driving state and the movable member 52 is in the locked position, there is a large static friction between the movable member 52 and the outer ring member 56, that is, the locking force of the movable member 52. When the locking force of the movable member 52 is greater than the friction between the plurality of wheels 30 and the driving member 53, the plurality of wheels 30 cannot drive the driving member 53 to push the movable member 52 to move from the locked position to the unlocked position. The reverse rotation of the motor shaft 41 reduces the friction between the movable member 52 and the outer ring member 56 or directly moves the movable member 52 to the unlocked position. The movable member 52 can smoothly move to the unlocked position. The walk-behind machine 100 can be pulled or pushed smoothly.

As shown in FIG. 22, the movable member 52 is located at an unlocked position where the movable member 52 cannot simultaneously contact the groove wall 562 of the mounting groove 561 and the driving surface 571.

Since the movable member 52 cannot simultaneously contact the groove wall 562 of the mounting groove 561 and the driving surface 571, the transmission shaft 51 and the outer ring member 56 can freely rotate. That is, the transmission shaft 51 can freely rotate relative to the plurality of wheels 30. When the transmission shaft 51 stops rotating, and the plurality of wheels 30 rotate to drive the first transmission gear 54 and the outer ring member 56 to rotate in a counterclockwise direction (the direction indicated by the arrow), the second transmission gear 55 is driven to rotate clockwise by the plurality of wheels 30. That is, the plurality of wheels 30 apply a force to the driving member 53 opposite to the rotation direction of the first transmission gear 54, and the driving member 53 is driven to rotate by the plurality of wheels 30 to the position shown in FIG. 22. At this time, the driving member 53 blocks the movement of the movable member 52, preventing the movable member 52 from moving from the unlocked position to the locked position, keeping the movable member 52 in the unlocked position.

The middle portion of the driving surface 571 corresponds to the unlocked position of the movable member 52, and two locked positions are respectively on the right and left side of the unlocked position. The movable member 52 in FIG. 20 is at the locked position on the left side. The motor shaft of the first motor 40 rotates in a direction to drive the transmission shaft 51 to rotate in the arrow direction, so that the walk-behind machine 100 moves forward, that is, gets into the self-driving forward mode. When the motor shaft of the first motor 40 rotates in opposite direction to drive the transmission shaft 51 to rotate in a direction opposite to the arrow direction, the movable member 52 moves to the locked position on the right side, thereby realizing the backward movement, the self-driving backward mode, of the walk-behind machine 100.

The transmission principle and the unlocking principle of the clutch 50a are the same in the self-driving backward mode and the self-driving forward mode.

As shown in FIG. 2 to FIG. 9, the lawn mower includes a motor shield 44. The motor shield 44 accommodates the self-propelling motor. The motor shield 44 includes a motor guard portion 441 and a heat dissipating portion 442. The heat dissipating portion 442 protrudes from the motor guard portion 441 in a direction away from the ground. The motor guard portion 441 forms a motor cavity 4411 in which the self-propelling motor is located. The heat dissipating portion 442 forms a heat dissipating cavity 4421 connected through with the motor cavity 4411. The heat dissipating portion 442 is provided with heat dissipating hole 4422 which connects the heat dissipating cavity 4421 and the outside of the heat dissipating portion 442. The heat dissipating portion 442 can avoid reducing the heat dissipating effect by preventing the grass cuttings from blocking the heat dissipating holes 4422 or from entering the motor cavity 4411.

The heat dissipating portion 442 protrudes from the motor guard portion 441 in the radial direction of the rotational axis 103 of the motor shaft. The heat dissipating portion 442 is connected to one end of the motor guard portion 441 in the axial direction of the rotational axis 103 of the motor shaft.

The self-propelling motor further includes a heat dissipating fan 43 fixed to the motor shaft. The motor guard portion 441 forms an air hole 4412; and in the axial direction of the rotation axis 103 of the motor shaft, the position of the air hole 4412 corresponds to the position of the heat dissipating fan 43.

The heat dissipating fan 43 rotates to drive air to flow into the motor shield 44 from the heat dissipating holes 4422 and be exhausted from the air hole 4412.

The motor shield 44 forms two heat dissipating portions 442; the heat dissipating fan 43 is located between the two heat dissipating portions 442 in the axial direction of the rotational axis 103 of the motor shaft. In the axial direction of the rotational axis 103 of the motor shaft, the two heat dissipating portions 442 are respectively connected to the two ends of the motor guard portion 441.

The motor guard portion 441 further forms an auxiliary heat dissipating hole 4413, whose area is smaller than the area of the air hole 4412.

The heat dissipating holes 4422 are formed in a strip shape; the long longitudinal direction of the strips coincides with the convex direction of the heat dissipating portion 442. The heat dissipating hole 4422 is located on side wall of the heat dissipating portion 442.

The heat dissipating portion 442 forms auxiliary air hole 4423 located at the top end of the heat dissipating portion 442.

The lawn mower also includes an anti-wrapping sleeve 51a which is rotatably sleeved on the transmission shaft 51. The self-propelling motor drives the transmission shaft 51 to rotate about the central axis 101.

The anti-wrapping sleeve 51a can prevent the transmission shaft 51 from being entangled by the grass when it rotates.

The distance between the motor shield 44 and the anti-wrapping sleeve 51a is greater than 0 mm and less than or equal to 10 mm. The distance between the motor shield 44 and the anti-wrapping sleeve 51a is greater than 0 mm and less than or equal to 3 mm.

The anti-wrapping sleeve 51a is disposed at one end of the gearbox 80. The anti-wrapping sleeve 51a and the self-propelling motor are located on the same side of the gearbox 80.

An annular groove 851 is formed between the outer housing 85 and the transmission shaft 51. One end of the anti-wrapping sleeve 51*a* is located in the annular groove 851.

The anti-wrapping sleeve 51*a* defines a large end 511*a* and a small end 511*b*. The diameter of the large end 511*a* is greater than that of the small end 511*b*. The large end 511*a* of the anti-wrap 51*a* is closer to the gearbox 80 than the small end 511*b*. The large end 511*a* of the anti-wrapping sleeve 51*a* is located in the annular groove 851. The transmission shaft 51 extends through the gearbox 80.

The chassis 10 forms a motor housing cavity 12 in which the self-propelling motor is located. The opening of the motor housing cavity 12 coincides with that of the cutting cavity 11, and the opening of the motor housing cavity 12 is towards the ground.

In the direction of the central axis 101, the anti-wrap 51*a* is located between the gearbox 80 and the wall of the motor housing cavity 12.

The basic principles, main features and advantages of the present disclosure are described above. Those skilled in the art should understand that the above examples do not limit the disclosure in any way, and any technical solution of equivalent replacement or equivalent transformation is within the protection scope of the present disclosure.

What is claimed is:

1. A walk-behind machine comprising:
    a chassis;
    a handle connected to the chassis;
    a plurality of wheels for supporting the chassis and being rotatable relative to the chassis, wherein one of the plurality of wheels is a drive wheel;
    a motor mounted to the chassis and used for providing a driving force for rotating the drive wheel; and
    a transmission mechanism connecting the motor with the drive wheel,
    wherein the transmission mechanism comprises:
        a first clutch having a driving state where the motor drives the drive wheel to rotate and an unlocked state where the drive wheel is free to rotate relative to the motor,
    wherein, in the driving state, the motor is capable of driving the drive wheel to rotate in a first direction,
    wherein, when the motor stops rotating and the first clutch is in the driving state, the drive wheel rotates in a second direction opposite to the first direction to drive the first clutch to switch from the driving state to the unlocked state,
    wherein the transmission mechanism further comprises a transmission shaft for mounting the first clutch, the drive wheel is formed with a first wheel gear and a second wheel gear, the walk-behind machine further comprises a first transmission gear meshing with the first wheel gear and a second transmission gear meshing with the second wheel gear, the first transmission gear is configured to be driven by the transmission shaft,
    wherein, in the driving state, the transmission shaft rotates to drive the first transmission gear to rotate to drive the drive wheel to rotate, and
    wherein, when the motor stops rotating and the drive wheel rotates, the first transmission gear and the second transmission gear rotate in opposite directions and the second wheel gear drives the second transmission gear to rotate to drive the first clutch to switch from the driving state to the unlocked state.

2. The walk-behind machine of claim 1, wherein when the first clutch is in the unlocked state, the motor is activated to rotate in the first direction to drive the first clutch to switch from the unlocked state to the driving state.

3. The walk-behind machine of claim 1, wherein when the first clutch is in the unlocked state, the motor is activated to rotate in the second direction to drive the first clutch to switch from the unlocked state to the driving state.

4. The walk-behind machine of claim 1, wherein the transmission mechanism further comprises:
    a gearbox connecting the motor with the drive wheel.

5. The walk-behind machine of claim 1, wherein the plurality of wheels comprises two front wheels and two rear wheels and the drive wheel is one of the two rear wheels, the transmission mechanism further comprises a second clutch, the first clutch is coupled to the drive wheel, and the second clutch is coupled to the other of the two rear wheels.

6. The walk-behind machine of claim 1, wherein the plurality of wheels comprises a first wheel and a second wheel and the drive wheel is the first wheel, the transmission mechanism further comprises a second clutch, the first clutch is coupled to the first drive wheel, and the second clutch is coupled to the second wheel.

7. The walk-behind machine of claim 6, wherein the transmission shaft mounts the first clutch and the second clutch, the first clutch is mounted at one end of the transmission shaft, and the second clutch is mounted at the other end of the transmission shaft.

8. The walk-behind machine of claim 1, further comprising:
    a mowing blade for mowing grass,
    wherein the mowing blade is mounted to the chassis and is rotatable relative to the chassis.

9. The walk-behind machine of claim 1, further comprising:
    an auger for clearing snow,
    wherein the auger is mounted to the chassis and is rotatable relative to the chassis.

10. The walk-behind machine of claim 1, wherein the first clutch comprises:
    a movable member capable of moving between a locked position in which the first clutch is in the driving state and an unlocked position in which the first clutch is in the unlocked state;
    a driving member for driving the movable member to move;
    a fixing member coupled to the transmission shaft or as a part of the transmission shaft and forming a driving surface capable of driving the movable member; and
    an outer ring member sleeved on the transmission shaft, connected to the drive wheel to drive the drive wheel to rotate and forming a mounting groove,
    wherein the movable member is located between a wall of the mounting groove and the driving surface, and
    wherein when the motor stops rotating and the first clutch is in the driving state, the drive wheel rotates in the second direction opposite to the first direction to drive the driving member to rotate such that the driving member drives the movable member to move to the unlocked position.

11. A walk-behind machine comprising:
    a chassis;
    a handle connected to the chassis;
    a plurality of wheels for supporting the chassis and being rotatable relative to the chassis, wherein one of the plurality of wheels is a drive wheel;

a motor mounted to the chassis and used for providing a driving force for rotating the drive wheel; and a transmission mechanism connecting the motor with the drive wheel, wherein the transmission mechanism comprises:
  a first clutch having a driving state where the motor drives the drive wheel to rotate and an unlocked state where the drive wheel is free to rotate relative to the motor, wherein, in the driving state, the motor is capable of driving the drive wheel to rotate in a first direction, wherein, when the motor stops rotating and the first clutch is in the driving state, the drive wheel rotates in a second direction opposite to the first direction to drive the first clutch to switch from the driving state to the unlocked state, a first transmission gear mounted to an outer ring member, a transmission between the first transmission gear and the outer ring member is realized through a flat portion, the first transmission gear allowing the outer ring member to rotate relative to it within a predetermined angle, and a second transmission gear is mounted on the transmission mechanism, and the second transmission gear drives the drive wheel to rotate by friction.

12. A walk-behind machine comprising:
a chassis;
a handle connected to the chassis
a plurality of wheels for supporting the chassis and being rotatable relative to the chassis, wherein one of the plurality of wheels is a drive wheel;
a motor mounted to the chassis and used for providing a driving force for the drive wheel; and
a transmission mechanism for transmitting a power output from the motor to the drive wheel,
wherein the transmission mechanism comprises:
  a clutch having a driving state where the motor is capable of driving the drive wheel to rotate and an unlocked state where the drive wheel is free to rotate relative to the motor,
wherein, in the driving state, the motor is capable of driving the drive wheel to rotate in a first direction,
wherein, when the motor stops rotating and the clutch is in the driving state, the drive wheel rotates in the first direction to drive the clutch to switch from the driving state to the unlocked state,
wherein the transmission mechanism further comprises a transmission shaft for mounting the clutch, the drive wheel is formed with a first wheel gear and a second wheel gear, the walk-behind machine further comprises a first transmission gear meshing with the first wheel gear and a second transmission gear meshing with the second wheel gear, the first transmission gear is configured to be driven by the transmission shaft, wherein, in the driving state, the transmission shaft rotates to drive the first transmission gear to rotate to drive the drive wheel to rotate, and wherein, when the motor stops rotating and the drive wheel rotates, the first transmission gear and the second transmission gear rotate in opposite directions and the second wheel gear drives the second transmission gear to rotate to drive the clutch to switch from the driving state to the unlocked state.

13. The walk-behind machine of claim 12, wherein when the clutch is in the unlocked state, the motor is activated to rotate in the first direction to drive the clutch to switch from the unlocked state to the driving state.

14. The walk-behind machine of claim 12, wherein when the clutch is in the unlocked state, the motor is activated to rotate in a second direction to drive the clutch to switch from the unlocked state to the driving state.

15. The walk-behind machine of claim 12, wherein the transmission mechanism further comprises:
  a gearbox connecting the motor with the drive wheel.

16. The walk-behind machine of claim 12, wherein the plurality of wheels comprises two front wheels and two rear wheels and the drive wheel is one of the two rear wheels, the transmission mechanism further comprises a second clutch, the clutch is coupled to the drive wheel, and the second clutch is coupled to the other of the two rear wheels.

17. The walk-behind machine of claim 12, wherein the plurality of wheels comprises a first wheel and a second wheel and the drive wheel is the first wheel, the transmission mechanism further comprises a second clutch, the clutch is coupled to the drive wheel, and the second clutch is coupled to the second wheel.

18. The walk-behind machine of claim 17, wherein the transmission shaft mounts the clutch and the second clutch, the clutch is mounted at one end of the transmission shaft, and the second clutch is mounted at the other end of the transmission shaft.

19. The walk-behind machine of claim 12, further comprising:
  a mowing blade for mowing grass,
  wherein the mowing blade is mounted to the chassis and is rotatable relative to the chassis.

20. The walk-behind machine of claim 12, further comprising:
  an auger for clearing snow,
  wherein the auger is mounted to the chassis and is rotatable relative to the chassis.

* * * * *